United States Patent
Moon et al.

(10) Patent No.: US 10,334,524 B2
(45) Date of Patent: Jun. 25, 2019

(54) APPARATUS AND METHOD FOR CONTROLLING UPLINK DATA RETRANSMISSION

(71) Applicants: Samsung Electronics Co., Ltd., Suwon-si (KR); Korea Advanced Institute of Science and Technology, Daejeon (KR)

(72) Inventors: Jung-Min Moon, Suwon-si (KR); Minhoe Kim, Daejeon (KR); Dong Seok Roh, Daegu (KR); Dong-Ho Cho, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 15/713,298

(22) Filed: Sep. 22, 2017

(65) Prior Publication Data
US 2018/0084495 A1 Mar. 22, 2018

(30) Foreign Application Priority Data
Sep. 22, 2016 (KR) .................. 10-2016-0121462

(51) Int. Cl.
*H04W 52/02* (2009.01)
*H04W 74/08* (2009.01)
(Continued)

(52) U.S. Cl.
CPC ........... *H04W 52/0216* (2013.01); *H04L 1/18* (2013.01); *H04L 5/0055* (2013.01);
(Continued)

(58) Field of Classification Search
None
See application file for complete search history.

(56) References Cited

U.S. PATENT DOCUMENTS

| 9,185,722 B2 | 11/2015 | Larmo et al. |
| 2014/0079013 A1 | 3/2014 | Kim et al. |

(Continued)

OTHER PUBLICATIONS

Huawei, HiSilicon, "Contention based uplink transmission", 3GPP TSG-RAN WG2 Meeting #91bis, Oct. 5-9, 2015, 3 pages, R2-154191.

(Continued)

*Primary Examiner* — Eunsook Choi

(57) ABSTRACT

A 5th Generation (5G) or pre-5G communication system for supporting a higher data rate than a 4G communication system such as Long Term Evolution (LTE) is provided. A method of an evolved Node B (eNB) can include detecting a collision caused by first data received from a first terminal in a time resource for contention-based uplink data transmission and second data received from a second terminal in the time resource, determining a first delay value in first data retransmission using a dedicated scheduling scheme, and determining a second delay value in the first data retransmission using a contention-based uplink data transmission scheme, determining a scheme for retransmitting the first data based on the first delay value and the second delay value, and transmitting information indicating the determined scheme to the first terminal.

14 Claims, 15 Drawing Sheets

(51) Int. Cl.
*H04W 72/10* (2009.01)
*H04W 72/08* (2009.01)
*H04L 5/00* (2006.01)
*H04L 1/18* (2006.01)
*H04W 72/04* (2009.01)

(52) U.S. Cl.
CPC ......... *H04W 72/082* (2013.01); *H04W 72/10* (2013.01); *H04W 74/0841* (2013.01); *H04W 74/0858* (2013.01); *H04L 5/0048* (2013.01); *H04L 5/0051* (2013.01); *H04W 72/0446* (2013.01); *Y02D 70/00* (2018.01); *Y02D 70/10* (2018.01); *Y02D 70/12* (2018.01); *Y02D 70/126* (2018.01); *Y02D 70/1262* (2018.01); *Y02D 70/142* (2018.01); *Y02D 70/21* (2018.01)

(56) References Cited

U.S. PATENT DOCUMENTS

| | | | |
|---|---|---|---|
| 2014/0362795 A1* | 12/2014 | Choi | H04W 4/70 370/329 |
| 2018/0027575 A1* | 1/2018 | Shi | H04W 72/02 370/336 |
| 2018/0132279 A1* | 5/2018 | Yi | H04L 1/1861 |

OTHER PUBLICATIONS

"3rd Generation Partnership Project; Technical Specification Group Radio Access Network; Evolved Universal Terrestrial Radio Access (E-UTRA); Study on latency reduction techniques for LTE (Release 14)", 3GPP TR 36.881 V1.0.0 (May 2016), 98 pages.

* cited by examiner

APPARATUS AND METHOD FOR CONTROLLING UPLINK DATA RETRANSMISSION

CROSS-REFERENCE TO RELATED APPLICATION(S) AND CLAIM OF PRIORITY

The present application is related to and claims priority under 35 U.S.C. § 119(a) to Korean Patent Application No. 10-2016-0121462 filed Sep. 22, 2016, the entire disclosure of which is hereby incorporated by reference.

TECHNICAL FIELD

The present disclosure relates generally to wireless communication. More particularly, the present disclosure relates to an apparatus and a method for controlling uplink data retransmission.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" or a "post long term evolution (LTE) system."

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In order to provide wireless communication service to a user, a remote node generally performs random access to access a higher node (e.g., a host node). When the remote node attempts such random access, a signal for random access may not be transmitted to the host node due to a channel state or interference with another signal, or the host node may reject the attempt at random access. When the random access fails for this reason, the remote node repeatedly attempts the random access until the random access is successful. Such repetitive random access may cause excessive power consumption by the remote node that performs the random access and may cause interference with another remote node.

As terminals having various functions propagate increasingly, an amount of uplink data transmitted in a wireless environment increases. Also, the number of users demanding more rapid uplink data transmission grows fast.

SUMMARY

To address the above-discussed deficiencies, it is a primary object to provide an apparatus and a method for controlling uplink data retransmission.

According to one aspect of the present disclosure, a method of an evolved Node B (eNB) can include determining priorities of User Equipment's (UEs) including a first UE and a second UE, transmitting priority information of the first UE and information about the number of the UEs to the first UE, and transmitting priority information of the second UE and the information about the number of the UEs to the second UE, detecting a collision caused by first data received from the first UE in a time resource for contention-based uplink data transmission and second data received from the second UE in the time resource, and identifying a first resource for retransmitting the first data based on the priority information of the first UE and the information about the number of the UEs, and sending a Negative ACKnowledgement (NACK) signal including information indicating the collision to identify a second resource for retransmitting the second data based on the priority information of the second UE and the information about the number of the UEs, to the first UE and the second UE.

According to another aspect of the present disclosure, a method of an eNB can include detecting a collision caused by first data received from a first UE in a time resource for contention-based uplink data transmission and second data received from a second UE in the time resource, determining a first delay value in first data retransmission using a dedicated scheduling scheme, and determining a second delay value in the first data retransmission using a contention-based uplink data transmission scheme, determining a scheme for retransmitting the first data based on the first delay value and the second delay value, and transmitting information indicating the determined scheme to the first UE.

According to yet another aspect of the present disclosure, an apparatus of an eNB can include at least one transceiver, and at least one processor functionally coupled with the at least one transceiver and determining priorities of UEs including a first UE and a second UE, controlling to transmit priority information of the first UE and information about the number of the UEs to the first UE, and to transmit priority information of the second UE and the information about the number of the UEs to the second UE, detecting a collision caused by first data received from the first UE in a time resource for contention-based uplink data transmission and second data received from the second UE in the time resource, and identifying a first resource for retransmitting the first data based on the priority information of the first UE and the information about the number of the UEs, and controlling to send a NACK signal including information indicating the collision to identify a second resource for retransmitting the second data based on the priority information of the second UE and the information about the number of the UEs, to the first UE and the second UE.

According to still another aspect of the present disclosure, an apparatus of an eNB can include at least one transceiver, and at least one processor functionally coupled with the at least one transceiver and detecting a collision caused by first data received from a first UE in a time resource for contention-based uplink data transmission and second data received from a second UE in the time resource, determining a first delay value in first data retransmission using a dedicated scheduling scheme, and determining a second delay value in the first data retransmission using a contention-based uplink data transmission scheme, determining a scheme for retransmitting the first data based on the first delay value and the second delay value, and transmitting information indicating the determined scheme to the first UE.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior, as well as future uses of such defined words and phrases

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
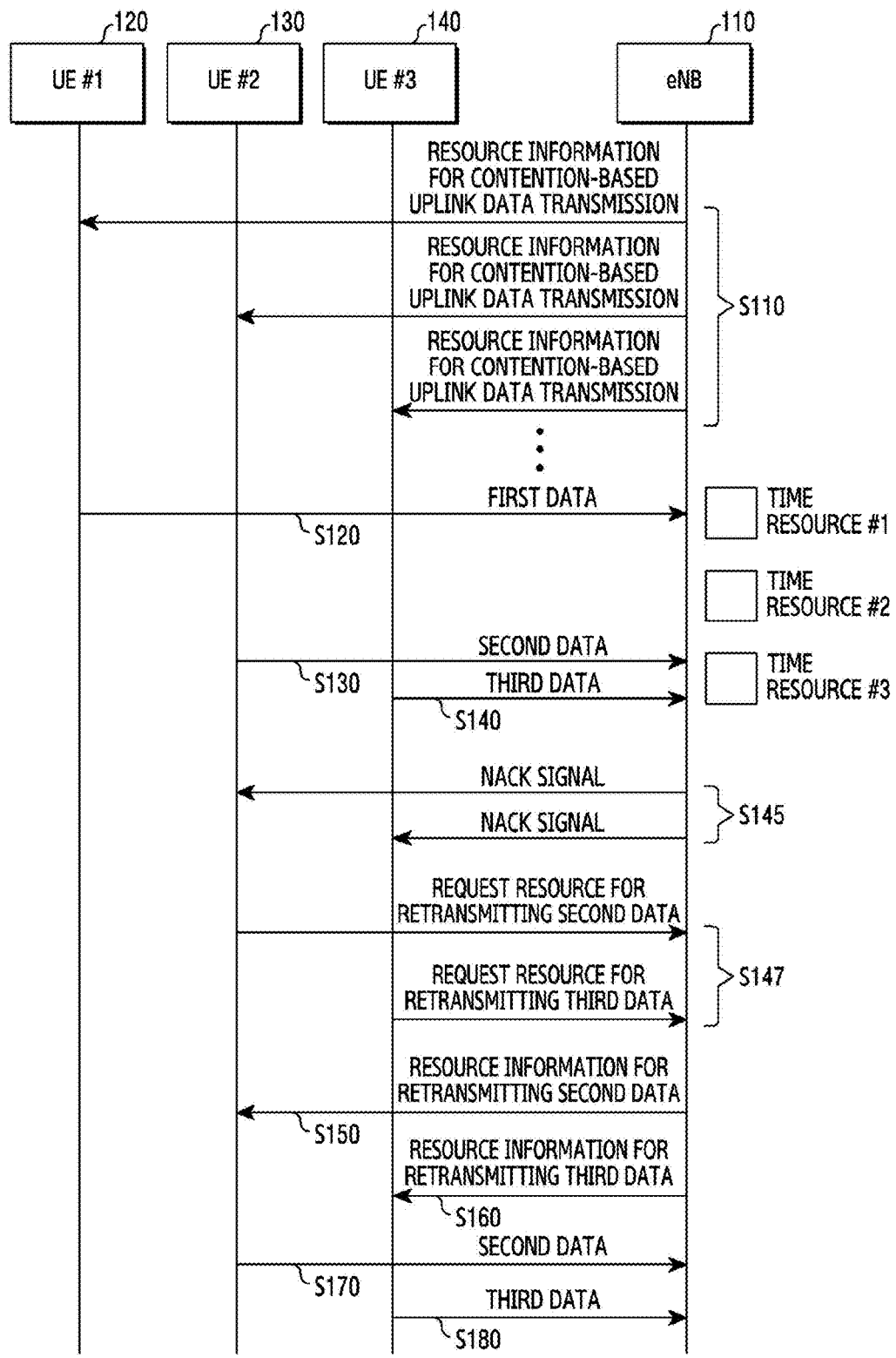
FIG. 1 illustrates signal flows between a User Equipment (UE) and an evolved Node B (eNB) in contention-based uplink data transmission.

Terms used in the present disclosure are used for only describing a specific embodiment and may not intend to limit the scope of other embodiments. A singular form can include a plurality of forms unless it is explicitly differently represented. All the terms used herein, including technical and scientific terms, can have the same meanings as terms that are generally understood by those skilled in the art. The terms defined in a general dictionary can be interpreted to have the same or similar meanings with the context of the relevant art, and, unless explicitly defined in this disclosure, it shall not be interpreted ideally or excessively as formal meanings. In some cases, even the terms defined in this disclosure cannot be interpreted to exclude the embodiments of the present disclosure.

In various embodiments of the present disclosure described below, a hardware approach will be described as an example. However, since the embodiments of the present disclosure include a technology using both hardware and software, the present disclosure does not exclude a software-based approach.

A persistent scheduling scheme which transmits uplink data using a pre-scheduled resource and a dynamic scheduling scheme which transmits uplink data by requesting an uplink grant are generally used for uplink data transmission.

The persistent scheduling scheme can guarantee low latency to a User Equipment (UE) which persistently transmits uplink data. However, the persistent scheduling scheme continually allocates wireless resources for the uplink data transmission, and accordingly can cause loss of the wireless resource when the UE intermittently transmits uplink data.

The dynamic scheduling scheme can allocate the wireless resource in an adequate amount to the UE which intermittently transmits uplink data. However, since the UE needs to request the uplink grant for the uplink data transmission and to receive the uplink grant, the dynamic scheduling scheme can cause delay.

Hence, for the uplink data transmission, a contention-based uplink data transmission scheme is considered. Herein, in the contention-based uplink data transmission scheme, a plurality of UEs competitively transmits uplink data over at least one resource randomly selected from resources for the contention-based uplink data transmission. Since the UEs which transmit the uplink data using the contention-based uplink data transmission scheme transmits the data over the randomly selected resource rather than an allocated resource, the contention-based uplink data transmission scheme can cause collisions between the UEs. To address the collisions between the UEs, each UE can retransmit the colliding uplink data using the contention-based uplink data transmission scheme or retransmit the colliding uplink data over a resource allocated for the retransmission.

However, retransmission of the colliding uplink data using the contention-based uplink data transmission scheme can cause another collision. Accordingly, what is needed is a retransmission scheme (or protocol) for raising a probability of success of the contention-based uplink data transmission.

The retransmission of the colliding uplink data over the resource allocated for the retransmission can cause delay due to a resource allocation procedure. Hence, to lessen the delay caused by the uplink data retransmission, a retransmission scheme of less complexity is demanded.

FIG. 1 illustrates signal flows between a UE and an evolved Node B (eNB) in contention-based uplink data transmission.

In FIG. 1, an eNB 110 can provide a wireless communication service to a first UE 120, a second UE 130, and/or a third UE 140. In some embodiments, the eNB 110 can be a fixed apparatus. According to embodiments, the eNB 110 may be referred to as a base station, an Access Point (AP), and the like.

The first UE 120, the second UE 130, and the third UE 140 each can receive the wireless communication service from the eNB 110. In some embodiments, the first UE 120, the second UE 130, and the third UE 140 can be mobile. For example, the first UE 120, the second UE 130, and the third UE 140 each can be a mobile phone, a smart phone, a music player, a potable game console, a navigation system, a laptop computer, and so on. According to embodiments, the first UE 120, the second UE 130, and the third UE 140 each may be referred to as a mobile station, a terminal, a STAtion (STA), and the like.

Referring to FIG. 1, in S110, the eNB 110 can transmit resource information for contention-based uplink data transmission to the first UE 120, the second UE 130, and the third UE 140. For example, the eNB 110 can transmit the resource information for the contention-based uplink data transmission to the first UE 120, the second UE 130, and the third UE 140 through an uplink grant. The first UE 120, the second UE 130, and the third UE 140 can receive the resource information for the contention-based uplink data transmission from the eNB 110.

In S120, the first UE 120 can transmit first data in a first time resource randomly selected from a plurality of resources (e.g., the first time resource, a second time resource, and a third time resource) identified based on the received resource information for the contention-based uplink data transmission.

In S130, the second UE 130 can transmit second data in the third time resource randomly selected from the resources identified based on the received resource information for the contention-based uplink data transmission.

In S140, the third UE 140 can transmit third data in the third time resource randomly selected from the resources identified based on the received resource information for the contention-based uplink data transmission.

Since the second data and the third data are transmitted in the same time resource which is the third time resource, a collision can be caused. In other words, the eNB 110 may not properly decode the second data and the third data.

In S145, the eNB 110 can send a Negative ACKnowledgement (NACK) signal indicating the decoding failure of the second data and the third data to the second UE 130 and the third UE 140. The second UE 130 and the third UE 140 can receive the NACK signal.

In S147, in response to the received NACK signal, the second UE 130 can request a resource for retransmitting the second data from the eNB 110. Also, in response to the received NACK signal, the third UE 140 can request a resource for retransmitting the third data from the eNB 110.

In S150, the eNB 110 can transmit resource information for retransmitting the second data to the second UE 130.

In S160, the eNB 110 can transmit resource information for retransmitting the third data to the third UE 140.

In S170, the second UE 130 can retransmit the second data to the eNB 110 based on the received resource information for retransmitting the second data. The eNB 110 can receive the retransmitted second data from the second UE 130.

In S180, the third UE 140 can retransmit the third data to the eNB 110 based on the received resource information for retransmitting the third data. The eNB 110 can receive the retransmitted third data from the third UE 140.

As such, when the collision arises, the contention-based uplink data transmission scheme can cause delay in the uplink data retransmission of S145 through S160. In this regard, the present disclosure provides embodiments of an apparatus and methods for lessening the delay in the contention-based uplink data transmission associated with the uplink data retransmission procedure.

Figure 2:
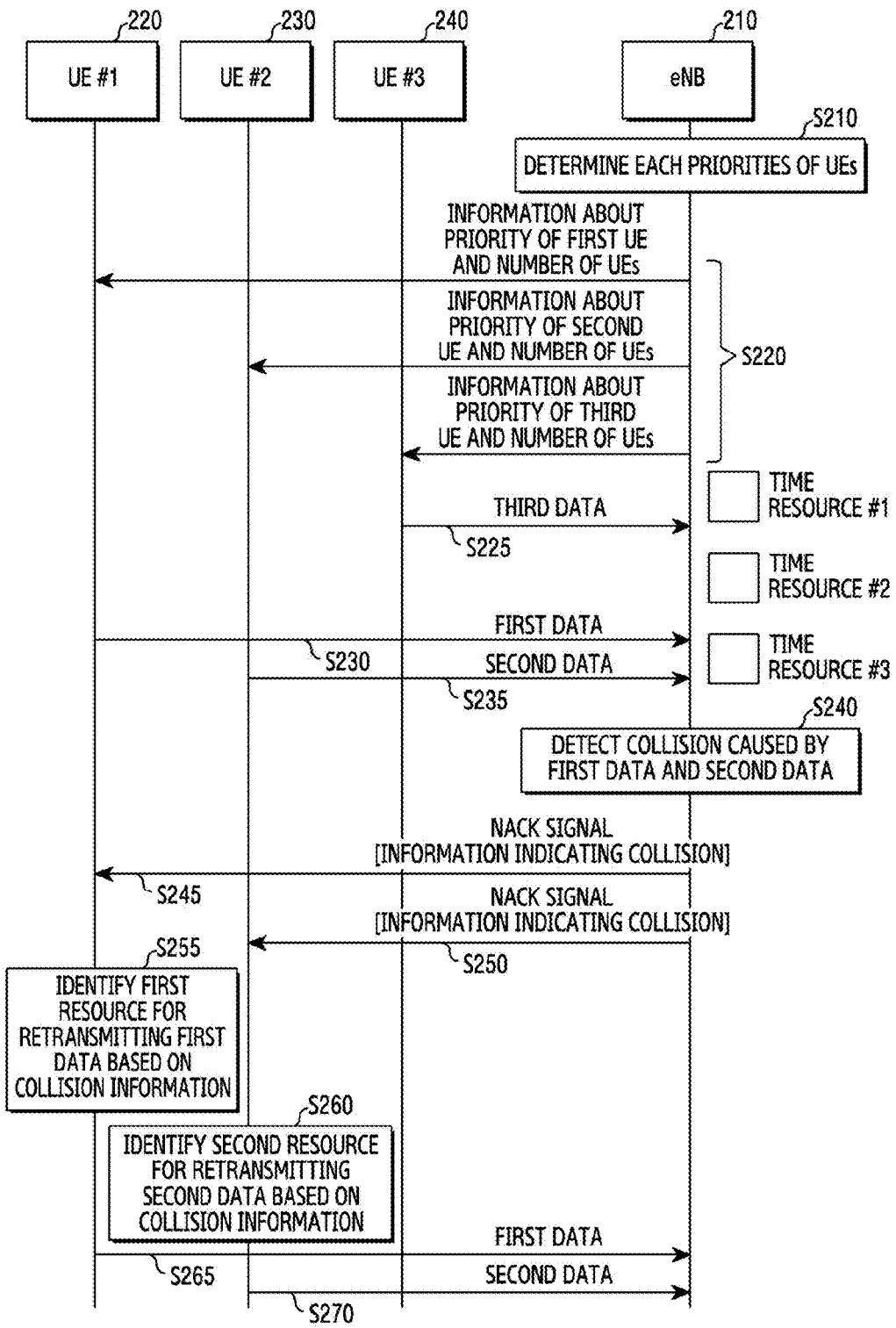
FIG. 2 illustrates signal flows between an eNB and a UE which retransmits data in contention-based uplink data transmission, according to various embodiments of the present disclosure.

FIG. 2 illustrates signal flows between a UE which retransmits data in contention-based uplink data transmission, and an eNB according to various embodiments of the present disclosure.

In FIG. 2, an eNB 210 can provide a wireless communication service to a first UE 220, a second UE 230, and/or a third UE 240. In some embodiments, the eNB 210 can be a fixed apparatus. According to embodiments, the eNB 210 may be referred to as a base station, an AP, and the like.

The first UE 220, the second UE 230, and the third UE 240 can receive the wireless communication service from the eNB 210. In some embodiments, the first UE 220, the second UE 230, and the third UE 240 can be mobile devices. For example, the first UE 220, the second UE 230, and the third UE 240 each can be a mobile phone, a smart phone, a music player, a potable game console, a navigation system, a laptop computer, and so on. According to embodiments, the first UE 220, the second UE 230, and the third UE 240 each may be referred to as a mobile station, a terminal, a STA, and the like.

In FIG. 2, it is assumed that the first UE 220, the second UE 230, and the third UE 240 each receive resource information for contention-based uplink data transmission from the eNB 210. That is, the first UE 220, the second UE 230, and the third UE 240 can be aware of resources for the contention-based uplink data transmission.

Referring to FIG. 2, in S210, the eNB 210 can determine priorities of the first UE 220, the second UE 230, and the third UE 240.

In some embodiments, based on previous transmission information of the first UE 220, the second UE 230, and the third UE 240, the eNB 210 can determine a type of data to receive from the first UE 220, the second UE 230, and the third UE 240. Herein, the data type can also be a parameter for determining a required delay of the data. The data type can be also a parameter indicating Quality of Service (QoS). For example, the data type can be classified to a voice class, a streaming class, an interactive class, and a background class, according to the required delay or delay sensitivity. Based on the determined data type, the eNB 210 can determine the priorities of the first UE 220, the second UE 230, and the third UE 240. Herein, the priority of the UE which is to transmit data of higher delay sensitivity than the other UEs can be higher the priority of the other UEs.

In some other embodiments, the eNB 210 can arbitrarily determine the priorities of the first UE 220, the second UE 230, and the third UE 240. For example, when the eNB 210 cannot determine the previous transmission information of the first UE 220, the second UE 230, and the third UE 240, the eNB 210 can arbitrarily determine the priorities of the first UE 220, the second UE 230, and the third UE 240.

In S220, the eNB 210 can transmit information of the priority of the first UE 220 and information about the total number of UEs (e.g., three UEs in FIG. 2) participating in the contention-based uplink data transmission to the first UE 220, transmit priority information of the second UE 230 and the information of the total number of the UEs participating in the contention-based uplink data transmission to the second UE 230, and transmit priority information of the third UE 240 and the information of the total number of the UEs participating in the contention-based uplink data transmission to the third UE 240. Herein, when the data retransmission is required, the information transmitted to the first UE 220, the second UE 230, and the third UE 240 can be used by the first UE 220, the second UE 230, and the third UE 240 to identify the resource for the data retransmission. The first UE 220 can receive the priority information of the first UE 220 and the information of the total number of the UEs participating in the contention-based uplink data transmission from the eNB 210. The second UE 230 can receive the priority information of the second UE 230 and the information of the total number of the UEs participating in the contention-based uplink data transmission from the eNB 210. The third UE 240 can receive the priority information of the third UE 240 and the information of the total number of the UEs participating in the contention-based uplink data transmission from the eNB 210.

In S225, the third UE 240 can transmit third data in the first time resource randomly selected from resources (e.g., the first time resource, the second time resource, and the third time resource in FIG. 2) for the contention-based uplink data transmission.

In S230, the first UE 220 can transmit first data in the third time resource randomly selected from the resources for the contention-based uplink data transmission.

In S235, the second UE 230 can transmit second data in the time resource randomly selected from the resources for the contention-based uplink data transmission.

In S240, the eNB 210 can detect a collision caused by the first data and the second data. For example, the eNB 210 may not normally decode the first data and the second data received over the third time resource. This is because the first data and the second data are received over the same time resource, which in this example, is the third time resource. In response to the failure to fully decode the first data and the second data, the eNB 210 can detect the collision caused by the first data and the second data.

Although the first data and the second data are not successfully fully decoded, the eNB 210 can still identify the entity which transmits the first data and the entity which transmits the second data. For example, the eNB 210 can identify an IDentifier (ID) of the first UE 220 and an ID of the second UE 230 from the first data and the second data received over the third time resource based on Demodulation Reference Signals (DMRSs) received from the first UE 220 and the second UE 230. The eNB 210 can identify the first data transmission from the first UE 220 based on the ID of the first UE 220, and identify the second data transmission from the second UE 230 based on the ID of the second UE 230.

In S245, the eNB 210 can send a NACK signal including information indicating the detected collision to the first UE 220. The eNB 210 can send the NACK signal including the information indicating the detected collision to the first UE 220 which transmits the first data based on the ID of the first UE 220.

In S250, the eNB 210 can send a NACK signal including the information indicating the detected collision to the second UE 230. The eNB 210 can send the NACK signal including the detected collision information to the second UE 230 which transmits the second data based on the ID of the second UE 230.

In S255, the first UE 220 can identify a first resource for retransmitting the first data based on the collision information of the received NACK signal.

In S260, the second UE 230 can identify a second resource for retransmitting the second data based on the collision information of the received NACK signal.

For example, the first UE 220 and the second UE 230 can identify the first resource for retransmitting the first data and the second resource for retransmitting the second data using the a table of situations and index values, such as shown in Table 1.

TABLE 1

| Index | Situation |
|---|---|
| 1 | UE having a priority A and UE having a priority B transmit data in the same time resource. |
| 2 | UE having a priority B and UE having a priority C transmit data in the same time resource. |
| 3 | UE having a priority C and UE having a priority A transmit data in the same time resource. |
| 4 | UE having a priority A, UE having a priority B and UE having a priority C transmit data in the same time resource. |

In Table 1, the index is a value indicating a situation, and the situation indicates which UEs of the UEs participating in the contention-based uplink data transmission transmit data in the same time resource.

In some embodiments, the index can be the information indicating the collision in the transmitted NACK signal. For example, when the first UE 220 has a priority B, the second UE 230 has a priority C lower than the priority B, and the first data and the second data cause the collision as shown in FIG. 2, the eNB 210 can send the NACK signal including the index 2 of the indexes of Table 1 as the collision information, to the first UE 220 and the second UE 230. The first UE 220 receiving the NACK signal can determine the first resource to be the resource having the delay corresponding to the priority of the first UE 220 among resources allocated for the data retransmission based on the index 2, the priority information (e.g., the priority B) of the first UE 220, and the information about the total number of the UEs participating in the contention-based uplink data transmission. The second UE 230 receiving the NACK signal can determine, as the second resource, the resource having the delay corresponding to the priority of the second UE 230 among the resources allocated for the data retransmission based on the index 2, the priority information (e.g., the priority C) of the second UE 230, and the information about the total number of the UEs participating in the contention-based uplink data transmission. Since the priority of the first UE 220 is higher than the priority of the second UE 230, the delay of the first resource can be less than the delay of the second resource.

In the non-limiting example of Table 1, the three UEs perform the contention-based uplink data transmission. Table 1 may be re-configured according to the number of UEs conducting the contention-based uplink data transmission. For example, when the number of the UEs conducting the contention-based uplink data transmission is N, the number of the indexes can be defined based on Equation 1.

$$N_{index} = 2^N - \binom{N}{1} - 1 \quad (1)$$

In Equation 1, N denotes the number of the UEs conducting the contention-based uplink data transmission, $2^N$ denotes the number of all cases where the UEs transmit uplink data, $$\binom{N}{1}$$

denotes the number of cases (i.e., the number of cases of contention-based uplink data transmission without collisions) where only one of the UEs transmits uplink data, and 1 denotes the number of cases where none of the UEs transmit uplink data.

Table 1 can be configured by mapping cases where all or some of the UEs collide, to $N_{index}$-ary indexes according to a predefined rule.

In S265, the first UE 220 can retransmit the first data to the eNB 210 over the identified first time resource. The eNB 210 can receive the first data retransmitted from the first UE 220 over the first time resource.

In S270, the second UE 230 can retransmit the second data to the eNB 210 over the identified second time resource. The eNB 210 can receive the second data retransmitted from the second UE 230 over the second time resource.

Since the first time resource is delayed less than the second time resource, the first data can be transmitted to the eNB 210 earlier than the second data.

As such, by using the priority information, the information about the number of the UEs conducting the contention-based uplink data transmission, and the collision information, the apparatus and the method according to various embodiments of the present disclosure do not need to signal for the data retransmission (e.g., requesting the resource for the data retransmission in S147 of FIG. 1 and wait to receive the resource information for the data retransmission in S150 and S160 of FIG. 1). Hence, when a collision occurs in the contention-based uplink data transmission, the apparatus and the method according to various embodiments of the present disclosure can provide the uplink data retransmission with less complexity and less delay.

Figure 3:
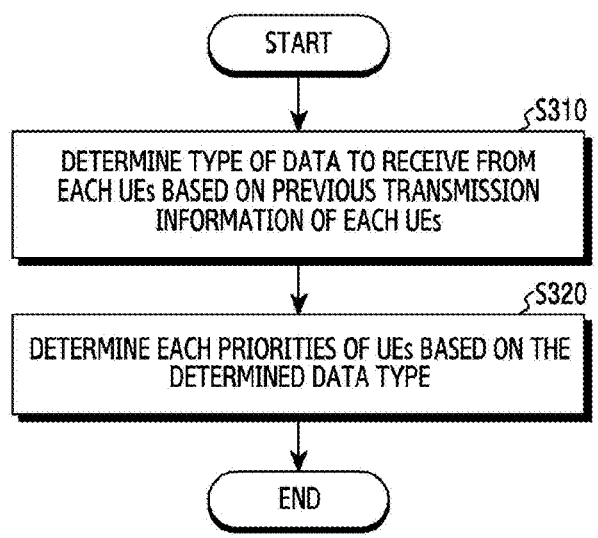
FIG. 3 illustrates operations of an eNB for determining a priority according to various embodiments of the present disclosure.

FIG. 3 illustrates the operation of an eNB for determining a priority according to various embodiments of the present disclosure. The operations of the eNB can be carried out by the eNB 210 of FIG. 2.

Referring to FIG. 3, in S310, the eNB 210 can determine a type of data to receive from UEs based on previous transmission information of the UEs. For example, when a UE A for the contention-based uplink data transmission transmits image data to the eNB 210 in the previous transmission and a UE B for the contention-based uplink data transmission transmits voice data for calling other UE to the eNB 210 in the previous transmission, the eNB 210 can determine the type of the data to transmit from the UE A as the image data and determine the type of the data to transmit from the UE B as the voice data for calling the other UE.

In S320, the eNB 210 can determine priorities of the UEs based on the determined data type. For example, when the type of the data to transmit from the UE A is the image data and the type of the data to transmit from the UE B is the voice data for the call with the other UE, delay sensitivity of the data to transmit from the UE B can be higher than delay sensitivity of the data to transmit from the UE A. In this case, to make the delay of the data to transmit from the UE B less than the delay of the data to transmit from the UE A, the eNB 210 can determine the priority of the UE A and the priority of the UE B such that the priority of the UE B is higher than the priority of the UE A.

As such, the apparatus and the method according to various embodiments of the present disclosure can determine the priority of the UE according to the type of the data to transmit from the UE and thus process data having the higher delay sensitivity first.

Figure 4:
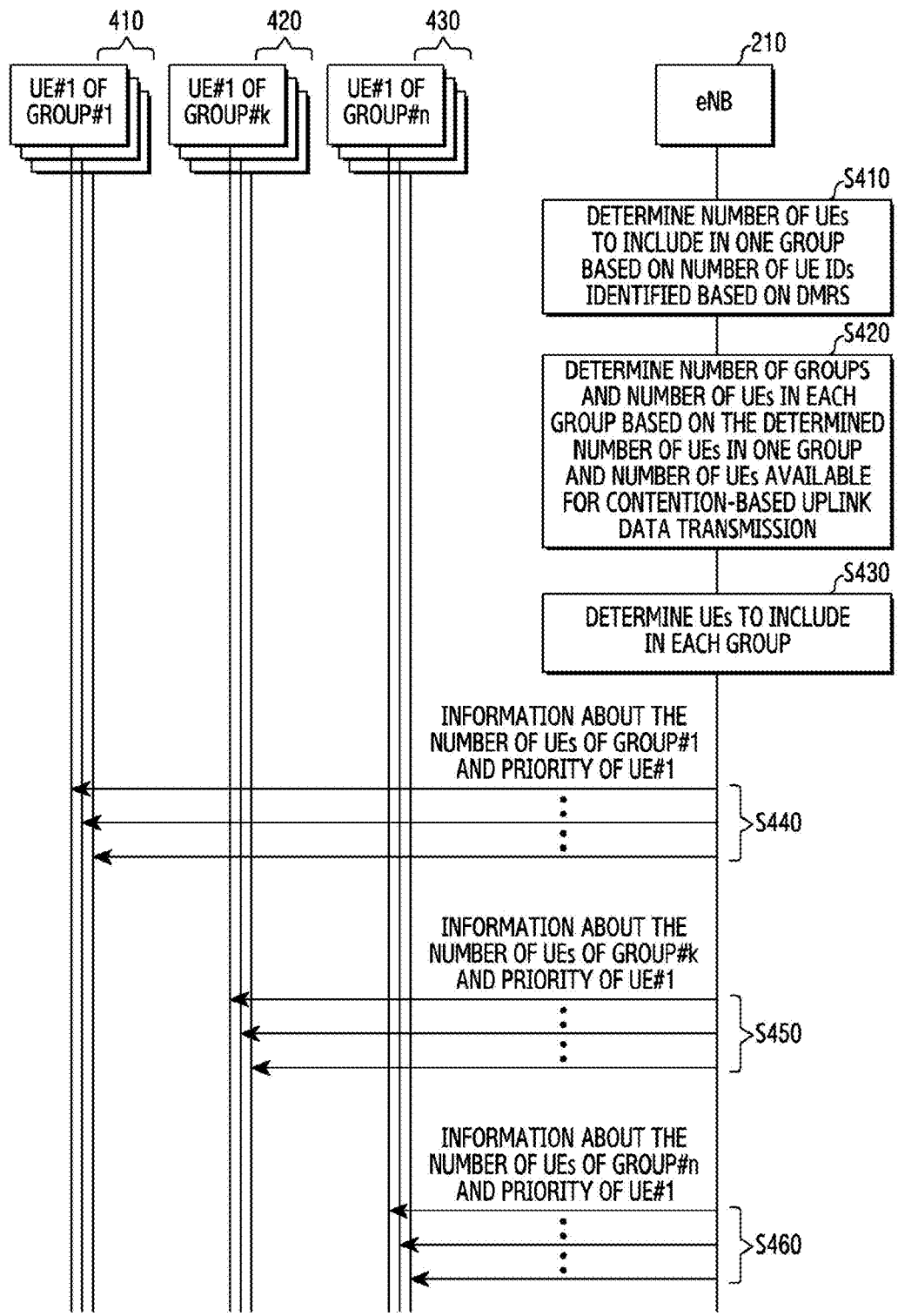
FIG. 4 illustrates signal flows between an eNB which groups a plurality of UEs, and a UE according to various embodiments of the present disclosure.

FIG. 4 illustrates signal flows between a UE and an eNB which groups a plurality of UEs and a UE according to various embodiments of the present disclosure.

Referring to FIG. 4, in S410, the eNB 210 can determine the number of UEs to include in one group based on the number of UE IDs identified based on DMRS. The number of the UE IDs identified (or distinguished) by the eNB 210 based on the DMRSs received from the UEs can be limited. For example, according to a Long Term Evolution (LTE) standard, the maximum number of the UE IDs identified by the eNB 210 based on the DMRS can be 4. Accordingly, to specify a UE for receiving the NACK signal, the eNB 210 can determine the number of the UEs in one group based on the DMRS. Herein, the UEs included in the one group can use resources of the same range for the contention-based uplink data transmission.

In S420, the eNB 210 can determine the number of groups and the number of UEs in each group based on the determined number of the UEs in one group and the number of UEs available for the contention-based uplink data transmission. For example, when the number of the UEs available for the contention-based uplink data transmission is 10 and the number of the UEs to include in the one group is 4, the eNB 210 can determine the number of the groups as three, the number of the UEs in the first group as four, the number of the UEs in the second group as four, and the number of the UEs in the third group as two. The number of the groups, the number of the UEs in the first group, the number of the UEs in the second group, and the number of the UEs in the third group can adaptively change according to embodiments. For example, the eNB 210 may determine the number of the groups as three, the number of the UEs in the first group as three, the number of the UEs in the second group as three, and the number of the UEs in the third group as four. For example, the eNB 210 can determine the number of the groups as four, the number of the UEs in the first group as two, the number of the UEs in the second group as two, the number of the UEs in the third group as three, and the number of the UEs in the fourth group as three. That is, the eNB 210 can adaptively change the number of the groups and the number of the UEs in each group based on one or more of the number of resources for the contention-based uplink data transmission which can be applied by the eNB 210, or based on a wireless environment state of the eNB 210.

In S430, the eNB 210 can determine UEs to include in each group. The UEs to include in each group can include the UEs of the determined priority in S210 of FIG. 2 and in the operations of FIG. 3. For example, when the priority of the first UE is 1, the priority of the second UE is 3, the priority of the third UE is 7, the priority of the fourth UE is 2, the priority of the fifth UE is 6, the priority of the sixth UE is 4, the priority of the seventh UE is 5, the priority of the eighth UE is 10, the priority of the ninth UE is 9, the priority of the tenth UE is 8, the number of the UEs to include in the first group is 3, the number of the UEs to include in the second group is 3, and the number of the UEs to include in the third group is 4, the eNB 210 can determine the UEs of the first group as the first UE, the sixth UE, and the third UE, determine the UEs of the second group as the fourth UE, the seventh UE, and the tenth UE, and determine the UEs of the third group as the second UE, the fifth UE, the ninth UE, and the eighth UE. In other words, the eNB 210 can determine the UEs of each group based on the priority of the UEs available for the contention-based uplink data transmission. According to embodiments, the eNB 210 may determine the UEs of each group using other schemes which classify the UEs.

In S440, the eNB 210 can transmit information about the number of the UEs of the first group and the priority in the group to UEs 410 of the first group. For example, the eNB 210 can transmit the information about the number of the UEs (e.g., three) of the first group and the priority (e.g., 1) of the first UE in the first group, to the first UE of the first group, and transmit the information about the number of the UEs (e.g., three) of the first group and the priority (e.g., 2) of the sixth UE in the first group, to the sixth UE.

In S450, the eNB 210 can transmit information about the number of the UEs and the priority of the second group to UEs 420 of the second group.

In S460, the eNB 210 can transmit information about the number of the UEs and the priority of the third group to UEs 430 of the third group.

As such, the UEs in the group can obtain the information about the number of the UEs and the priority in their group. When a collision occurs in the contention-based uplink data transmission, the UEs in the group can use the obtained information and thus identify a resource for data retransmission without having to allocate the resource for the data retransmission.

Figure 5A:
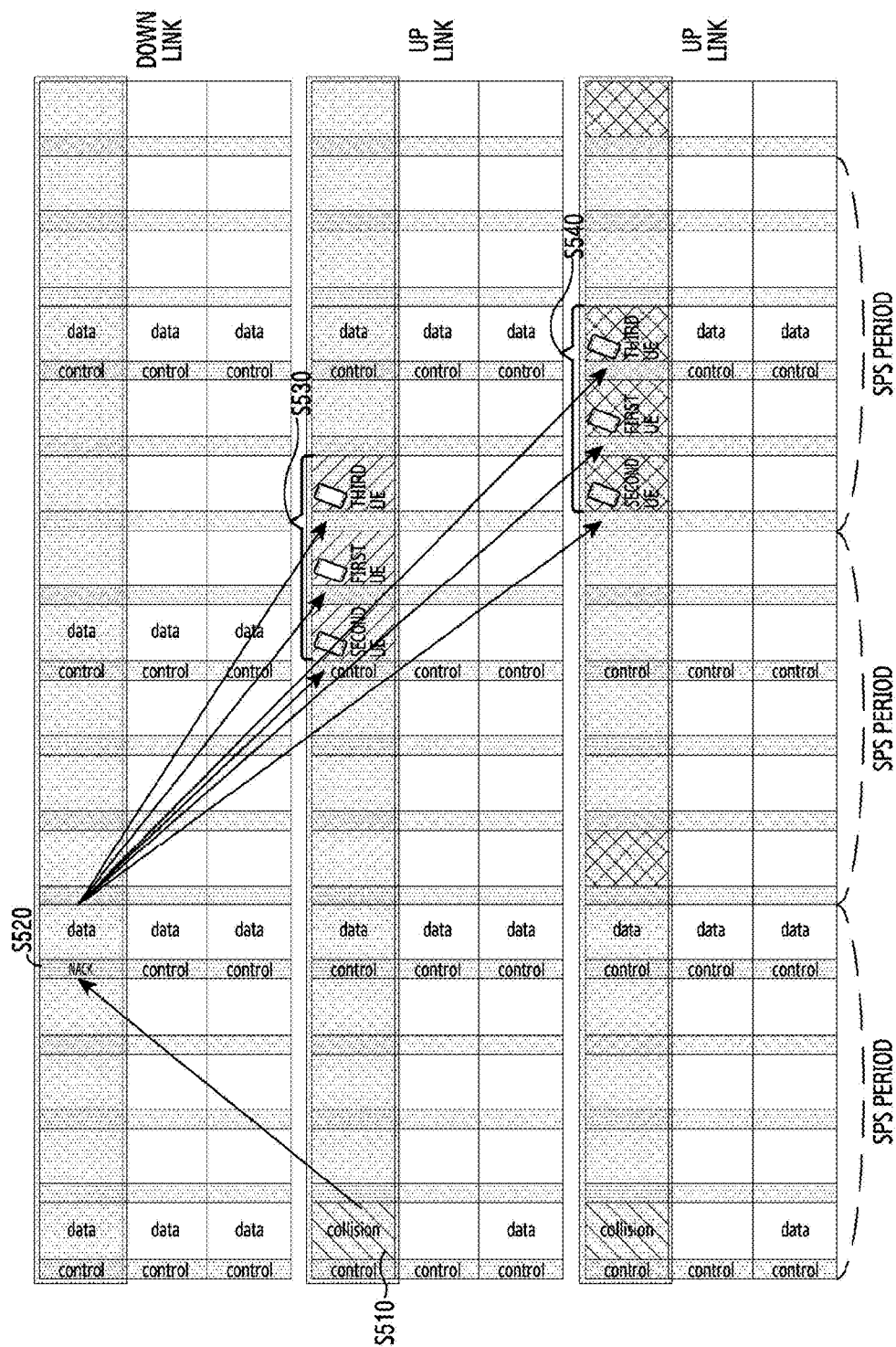
FIG. 5A illustrates an example of operations between a UE an eNB which allocates resources for retransmission in a Frequency Division Duplex (FDD) environment according to various embodiments of the present disclosure.

FIG. 5A illustrates an example of operations between a UE and an eNB which allocates resources for retransmission in an FDD environment according to various embodiments of the present disclosure.

Referring to FIG. 5A, in S510, the eNB 210 can receive first data from a first UE through contention-based uplink data transmission, second data from a second UE through contention-based uplink data transmission, and third data from a third UE through contention-based uplink data transmission over a subframe N. The first data, the second data, and the third data, which are transmitted in the same subframe N, can cause a collision. The eNB 210 can detect collision.

In S520, in response to the detected collision, the eNB 210 can send a NACK signal including information indicating the collision to the first UE, the second UE, and the third UE. The first UE, the second UE, and the third UE can receive the NACK signal including the collision information from the eNB 210. When to send (or to receive) the NACK signal can vary according to a system standard of the eNB 210. For example, when the eNB 210 is an eNB for the LTE standard, the eNB 210 can send the NACK signal to the first UE, the second UE, and the third UE over a subframe N+4 (4 subframes after the detected collision).

The first UE, the second UE, and the third UE receiving the NACK signal can identify a resource for their data retransmission among resources based on the collision information.

In some embodiments, the resources can be separate resources, rather than resources in a Semi-Persistent Scheduling (SPS) period configured in the eNB. For example, in S530, when the resources are allocated to the same frequency band from a subframe N+8 (e.g., after four subframes from the subframe N+4 carrying the NACK signal) according to the LTE standard, the second UE having the highest priority among the first UE, the second UE, and the third UE can transmit second data over the subframe N+8 based on the collision information, its priority information, and information about the total number of UEs in its group. The first UE having the second highest priority among the first UE, the second UE, and the third UE can transmit first data over a subframe N+9 based on the collision information, its priority information, and information about the total number of UEs in its group. The third UE having the lowest priority among the first UE, the second UE, and the third UE can transmit third data over a subframe N+10 based on the collision information, its priority information, and information about the total number of UEs in its group.

In some other embodiments, the resources may be included in the SPS period configured in the eNB. For example, in S540, when the resources are allocated from a subframe N+10 initiating the first SPS period after the subframe N+8 (e.g., after four subframes from the subframe N+4 carrying the NACK signal), the second UE having the highest priority among the first UE, the second UE, and the third UE can transmit second data over the subframe N+10 based on the collision information, its priority information, and information about the total number of the UEs in its group. The first UE having the second highest priority among the first UE, the second UE, and the third UE can transmit first data over a subframe N+11 based on the collision information, its priority information, and information about the total number of the UEs in its group. The third UE having the lowest priority among the first UE, the second UE, and the third UE can transmit third data over a subframe N+12 based on the collision information, its priority information, and information about the total number of the UEs in its group.

Figure 5B:
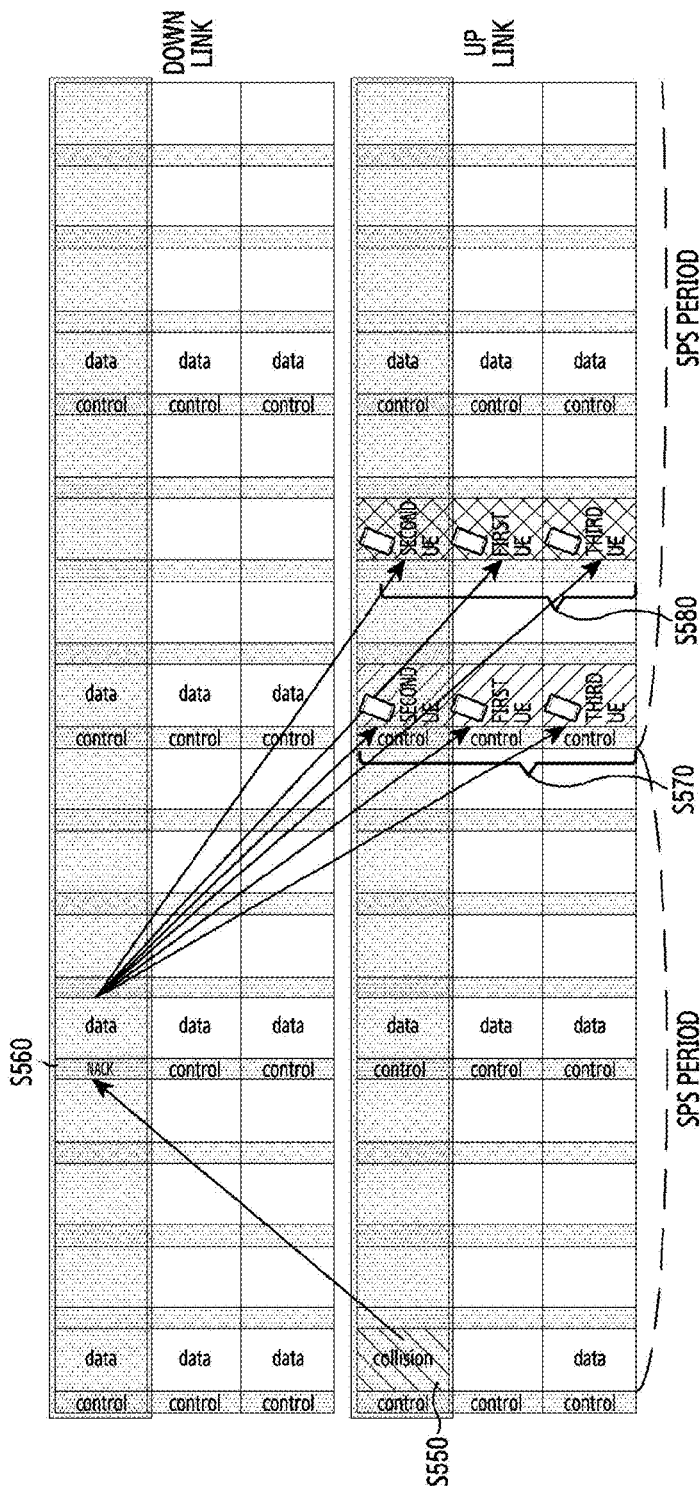
FIG. 5B illustrates another example of operations between a UE and an eNB which allocates resources for retransmission in an FDD environment, and a UE according to various embodiments of the present disclosure.

FIG. 5B illustrates another example of operations between a UE and an eNB for allocating resources for retransmission in an FDD environment according to various embodiments of the present disclosure.

Referring to FIG. 5B, in S550, the eNB 210 can receive first data from a first UE through contention-based uplink data transmission, second data from a second UE through the contention-based uplink data transmission, and third data from a third UE through the contention-based uplink data transmission over a subframe N. The first data, the second data, and the third data, which are transmitted in the same subframe N, can cause a collision. In this example, eNB 210 detected the collision.

In S560, in response to the detected collision, the eNB 210 can send a NACK signal including information indicating the collision to the first UE, the second UE, and the third UE. The first UE, the second UE, and the third UE can receive the NACK signal including the collision information from the eNB 210. When to send (or to receive) the NACK signal can vary according to a system standard of the eNB 210. For example, when the eNB 210 is for the LTE standard, the eNB 210 can send the NACK signal to the first UE, the second UE, and the third UE over a subframe N+4.

The first UE, the second UE, and the third UE receiving the NACK signal can identify a resource for their data retransmission among resources based on the collision information.

In some embodiments, the resources can be separate resources, rather than resources in a SPS period configured in the eNB. For example, in S570, when the resources are allocated to different frequency bands from a subframe N+8 according to the LTE standard, the second UE having the highest priority among the first UE, the second UE, and the third UE can retransmit the second data over the subframe N+8 in a first frequency band based on the collision information, its priority information, and information about the total number of UEs in its group. The first UE having the second highest priority among the first UE, the second UE, and the third UE can retransmit the first data over the subframe N+8 in a second frequency band based on the collision information, its priority information, and information about the total number of UEs in its group. The third UE having the lowest priority among the first UE, the second UE, and the third UE can retransmit the third data over the subframe N+8 in a third frequency band based on the collision information, its priority information, and information about the total number of UEs in its group.

In some other embodiments, the resources may be included in the SPS period configured in the eNB. For example, in S580, when the resources are allocated to different frequency bands from a subframe N+10 initiating the first SPS period after the subframe N+8, the second UE having the highest priority among the first UE, the second UE, and the third UE can retransmit the second data over the subframe N+10 in a first frequency band based on the collision information, its priority information, and information about the total number of UEs in its group. The first UE having the second highest priority among the first UE, the second UE, and the third UE can retransmit the first data over the subframe N+10 in a second frequency band based on the collision information, its priority information, and information about the total number of UEs in its group. The third UE having the lowest priority among the first UE, the second UE, and the third UE can retransmit the third data over the subframe N+10 in a third frequency band based on the collision information, its priority information, and information about the total number of UEs in its group.

Figure 6A:
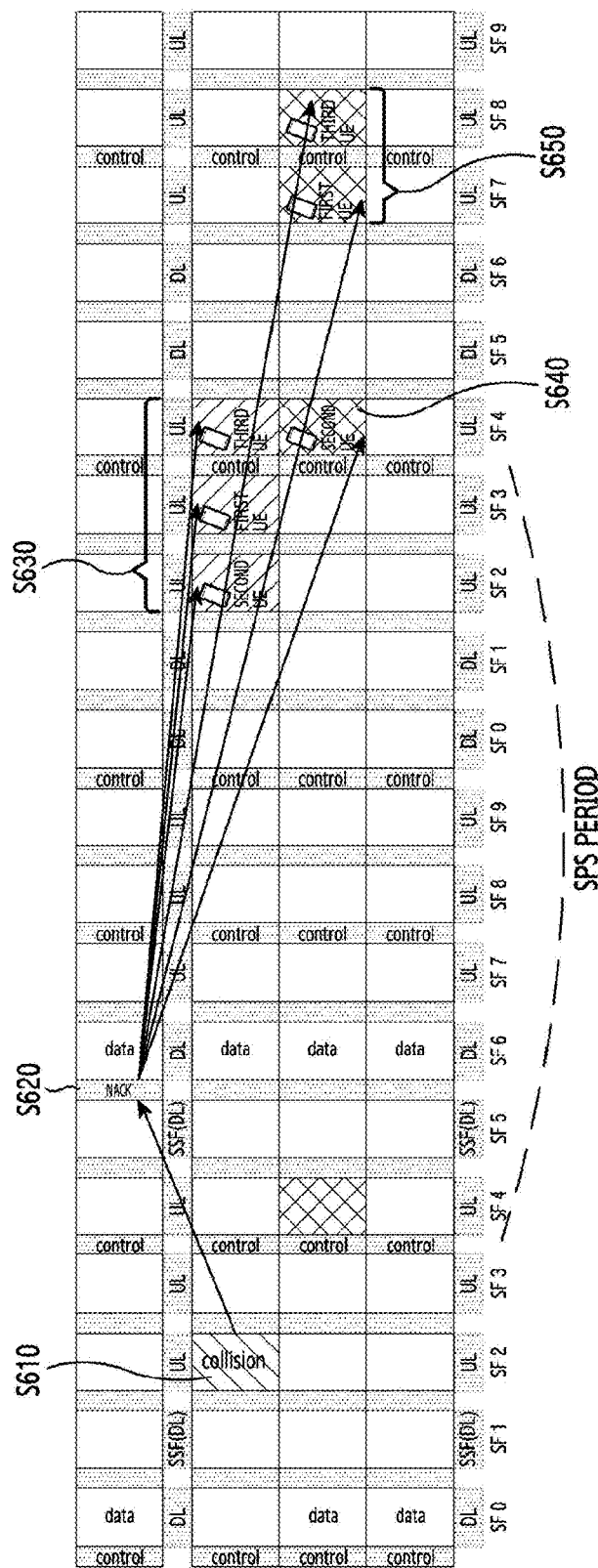
FIG. 6A illustrates an example of operations of between a UE and an eNB which allocates resources for retransmission in a Time Division Duplex (TDD) environment according to various embodiments of the present disclosure.

FIG. 6A illustrates an example of operations between a UE and an eNB for allocating resources for retransmission in a TDD environment according to various embodiments of the present disclosure.

In the TDD environment, a use of a subframe can be distinguished according to uplink-downlink configuration.

For example, when the eNB 210 is for the LTE standard, the uplink-downlink configuration can be set as shown in Table 2.

Uplink-Downlink Configurations

TABLE 2

| Uplink-downlink configuration | Downlink-to-uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, uplink-downlink configuration 3 uses subframe numbers 0, 4, 5, 6, 7, 8, and 9 for downlink transmission, uses subframe numbers 2, 3, and 4 for uplink transmission, uses a subframe number 1 for a guard time, and reserves the subframe number 1 for the uplink or downlink transmission.

Referring to FIG. 6A, in S610, the eNB 210 can receive first data from a first UE through contention-based uplink data transmission, second data from a second UE through the contention-based uplink data transmission, and third data from a third UE through the contention-based uplink data transmission, over a subframe 2 for uplink transmission configured according to the uplink-downlink configuration 0. The first data, the second data, and the third data, which are transmitted in the same subframe 2, can cause a collision. The eNB 210 can detect the collision.

In S620, in response to the detected collision, the eNB 210 can send a NACK signal including information indicating the collision to the first UE, the second UE, and the third UE. The first UE, the second UE, and the third UE can receive the NACK signal including the collision information from the eNB 210. When to send (or to receive) the NACK signal can vary according to a system standard of the eNB 210. The eNB 210 can send the NACK signal to the first UE, the second UE, and the third UE over a subframe 6 for downlink transmission of the NACK signal according to the uplink-downlink configuration 0 and/or Hybrid Automatic Repeat reQuest (HARQ) scheduling.

The first UE, the second UE, and the third UE receiving the NACK signal can identify a resource for their data retransmission among resources based on the collision information. In the TDD environment, the resources can be allocated based on the uplink-downlink configuration.

In some embodiments, the resources can be separate resources, rather than resources in an SPS period configured in the eNB. For example, in S630, with the uplink-downlink configuration 0, the resources can be set for uplink transmission according to the uplink-downlink configuration 0 and allocated to the same frequency band from a subframe 2 of a next frame allocated according to the HARQ scheduling. That is, the second UE having the highest priority among the first UE, the second UE, and the third UE can retransmit the second data over the subframe 2 of the next frame configured for uplink transmission according to the uplink-downlink configuration 0, based on the collision information, its priority information, and information about the total number of UEs in its group. The first UE having the second highest priority among the first UE, the second UE, and the third UE can retransmit the first data over a subframe 3 of the next frame configured for uplink transmission according to the uplink-downlink configuration 0, based on the collision information, its priority information, and information about the total number of UEs in its group. The third UE having the lowest priority among the first UE, the second UE, and the third UE can retransmit the third data over a subframe 4 (SF4) of the next frame configured for uplink transmission according to the uplink-downlink configuration 0, based on the collision information, its priority information, and information about the total number of UEs in its group.

In some other embodiments, the resources can be included in the SPS period configured in the eNB. For example, in S640, with the uplink-downlink configuration 0, the resources can be set for uplink transmission according to the uplink-downlink configuration 0 and allocated to the same frequency band from a subframe 4 of a next frame according to the first SPS period after the subframe 2 of the next frame allocated according to the HARQ scheduling. That is, the second UE having the highest priority among the first UE, the second UE, and the third UE can retransmit the second data over the subframe 4 of the next frame configured for uplink transmission according to the uplink-downlink configuration 0, based on the collision information, its priority information, and information about the total number of UEs in its group. The first UE can retransmit the first data over a subframe 7 of the next frame configured for uplink transmission according to the uplink-downlink configuration 0, based on the collision information, its priority information, and information about the total number of UEs in its group. The third UE can retransmit the third data over a subframe 8 of the next frame configured for uplink transmission according to the uplink-downlink configuration 0, based on the collision information, its priority information, and information about the total number of UEs in its group.

The eNB 210 receiving the retransmitted first data, second data, and third data can send an ACK signal to the first UE, the second UE, and the third UE.

Figure 6B:
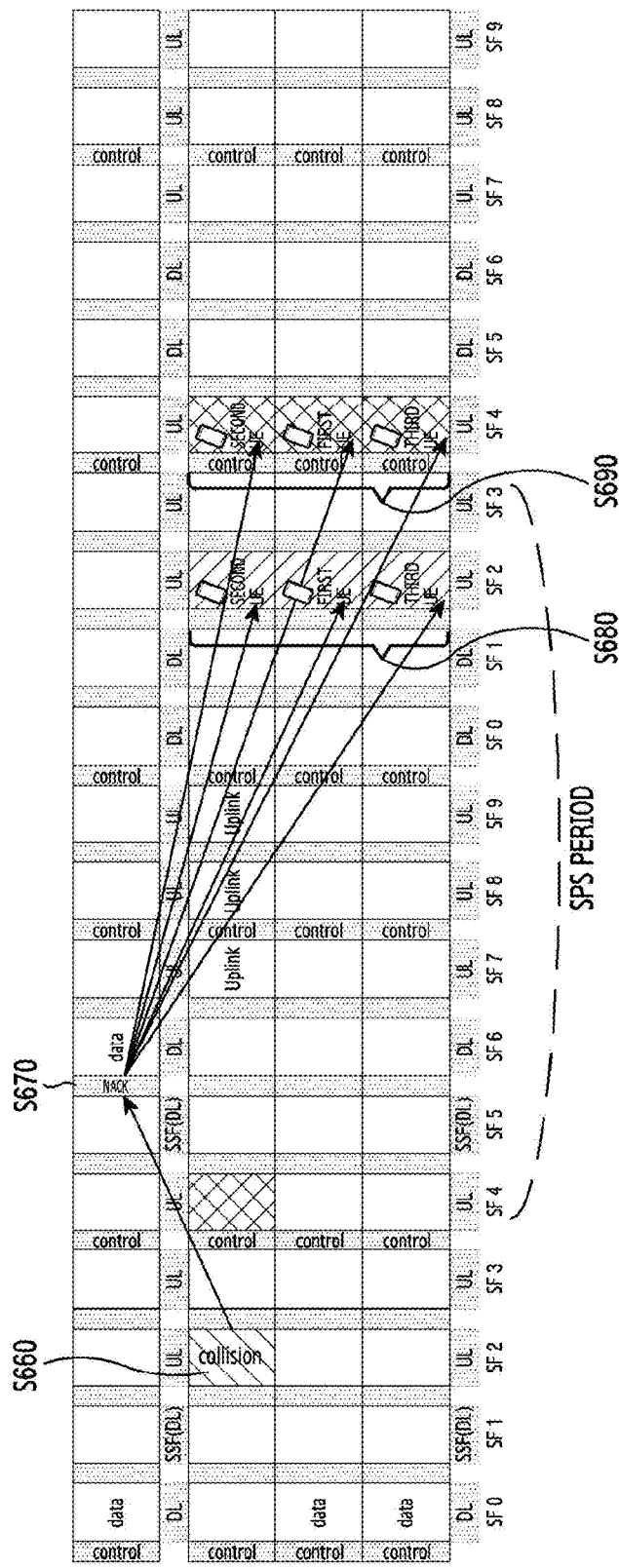
FIG. 6B illustrates another example of operations between a UE and an eNB which allocates resources for retransmission in a TDD environment according to various embodiments of the present disclosure.

FIG. 6B illustrates another example of operations of between a UE and eNB for allocating resources for retransmission in a TDD environment according to various embodiments of the present disclosure.

Referring to FIG. 6B, in S660, the eNB 210 can receive first data from a first UE through contention-based uplink data transmission, second data from a second UE through the contention-based uplink data transmission, and third data from a third UE through the contention-based uplink data transmission, over a subframe 2 for uplink transmission configured according to uplink-downlink configuration 0. The first data, the second data, and the third data, which are transmitted in the same subframe 2, can cause a collision. In this example, eNB 210 detected the collision.

In S670, in response to the detected collision, the eNB 210 can send a NACK signal including information indicating the collision to the first UE, the second UE, and the third UE. The first UE, the second UE, and the third UE can receive the NACK signal including the collision information from the eNB 210. When to send (or to receive) the NACK signal can vary according to a system standard of the eNB 210. The eNB 210 can send the NACK signal to the first UE, the second UE, and the third UE over a subframe 6 for downlink transmission of the NACK signal according to the uplink-downlink configuration 0 and HARQ scheduling.

The first UE, the second UE, and the third UE receiving the NACK signal can identify a resource for their data retransmission among resources based on the collision information. In the TDD environment, the resources can be allocated based on the uplink-downlink configuration.

In some embodiments, the resources can be separate resources, rather than resources in an SPS period configured in the eNB. For example, in S680, with the uplink-downlink configuration 0, the resources can be set for uplink transmission according to the uplink-downlink configuration 0 and allocated to different frequency bands from a subframe 2 of a next frame allocated according to the HARQ scheduling. That is, the second UE having the highest priority among the first UE, the second UE, and the third UE can retransmit the second data in a first frequency band over the subframe 2 of the next frame configured for uplink transmission according to the uplink-downlink configuration 0, based on the collision information, its priority information, and information about the total number of UEs in its group. The first UE having the second highest priority among the first UE, the second UE, and the third UE can retransmit the first data in a second frequency band over the subframe 2 of the next frame configured for uplink transmission according to the uplink-downlink configuration 0, based on the collision information, its priority information, and information about the total number of UEs in its group. The third UE having the lowest priority among the first UE, the second UE, and the third UE can retransmit the third data in a third frequency band over the subframe 2 of the next frame configured for uplink transmission according to the uplink-downlink configuration 0, based on the collision information, its priority information, and information about the total number of UEs in its group.

In some other embodiments, the resources may be included in the SPS period configured in the eNB. For example, in S690, with the uplink-downlink configuration 0, the resources can be set for uplink transmission according to the uplink-downlink configuration 0 and allocated to different frequency bands from a subframe 4 of a next frame according to the first SPS period after the subframe 2 of the next frame allocated according to the HARQ scheduling. That is, the second UE having the highest priority among the first UE, the second UE, and the third UE can retransmit the second data in a first frequency band over the subframe 4 of the next frame configured for uplink transmission according to the uplink-downlink configuration 0, based on the collision information, its priority information, and information about the total number of UEs in its group. The first UE can retransmit the first data in a second frequency band over a subframe 4 of the next frame configured for uplink transmission according to the uplink-downlink configuration 0, based on the collision information, its priority information, and information about the total number of UEs in its group. The third UE can retransmit the third data in a third frequency band over a subframe 4 of the next frame configured for uplink transmission according to the uplink-downlink configuration 0, based on the collision information, its priority information, and information about the total number of UEs in its group.

The eNB 210 receiving the retransmitted first data, second data, and third data can send an ACK signal to the first UE, the second UE, and the third UE.

Figure 6C:
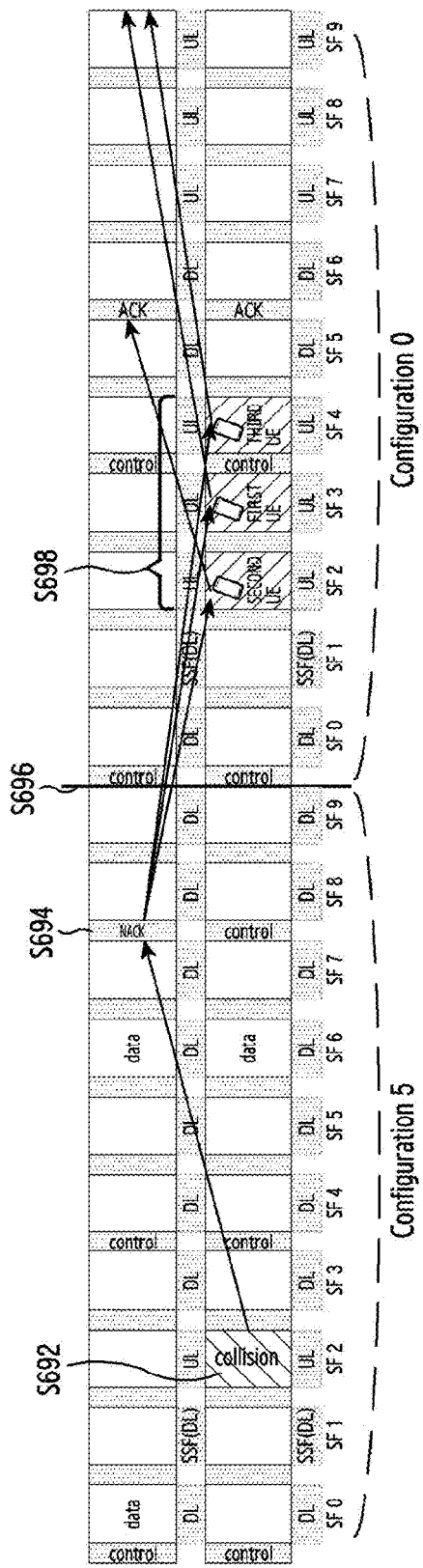
FIG. 6C illustrates yet another example of operations between a UE and an eNB which allocates resources for retransmission in a TDD environment according to various embodiments of the present disclosure.

FIG. 6C illustrates yet another example of operations between a UE and an eNB for allocating resources for retransmission in a TDD environment according to various embodiments of the present disclosure.

Referring to FIG. 6C, in S692, the eNB 210 can receive first data from a first UE through contention-based uplink data transmission, second data from a second UE through the contention-based uplink data transmission, and third data from a third UE through the contention-based uplink data transmission, over a subframe 2 for uplink transmission configured according to uplink-downlink configuration 5. The first data, the second data, and the third data, which are transmitted in the same subframe 2, can cause a collision. The eNB 210 can detect the collision.

In S694, in response to the detected collision, the eNB 210 can send a NACK signal including information indicating the collision to the first UE, the second UE, and the third UE. The first UE, the second UE, and the third UE can receive the NACK signal including the collision information from the eNB 210. When to send (or to receive) the NACK signal can vary according to a system standard of the eNB 210. The eNB 210 can send the NACK signal to the first UE, the second UE, and the third UE over a subframe 8 for downlink transmission of the NACK signal according to the uplink-downlink configuration 5 and HARQ scheduling.

The uplink-downlink configuration can include fewer subframes for the uplink transmission. For example, as shown in Table 2, the uplink-downlink configuration 5 includes only one subframe (subframe number 5) as the subframe for the uplink transmission among the subframes of the frame. By considering the number of subframes of colliding data and the number of the subframes for uplink transmission, the eNB 210 can change the uplink-downlink configuration to secure more subframes for uplink transmission.

Hence, in S696, to use subframes 2, 3, and 4 for uplink transmission according to the uplink-downlink configuration 0, as resources for retransmitting the first data, the second data, and the third data, the eNB 210 can change the uplink-downlink configuration from the uplink-downlink configuration 5 to the uplink-downlink configuration 0.

In S698, the second UE having the highest priority among the first UE, the second UE, and the third UE can retransmit the second data over the subframe 2 for uplink transmission according to the changed uplink-downlink configuration 0. The first UE having the second highest priority among the first UE, the second UE, and the third UE can retransmit the first data over a subframe 3 configured for uplink transmission according to the changed uplink-downlink configuration 0 its group. The third UE having the lowest priority among the first UE, the second UE, and the third UE can retransmit the third data over a subframe 4 configured for uplink transmission according to the changed uplink-downlink configuration 0.

The eNB 210 receiving the retransmitted first data, second data, and third data can send an ACK signal to the first UE, the second UE, and the third UE.

Figure 7:
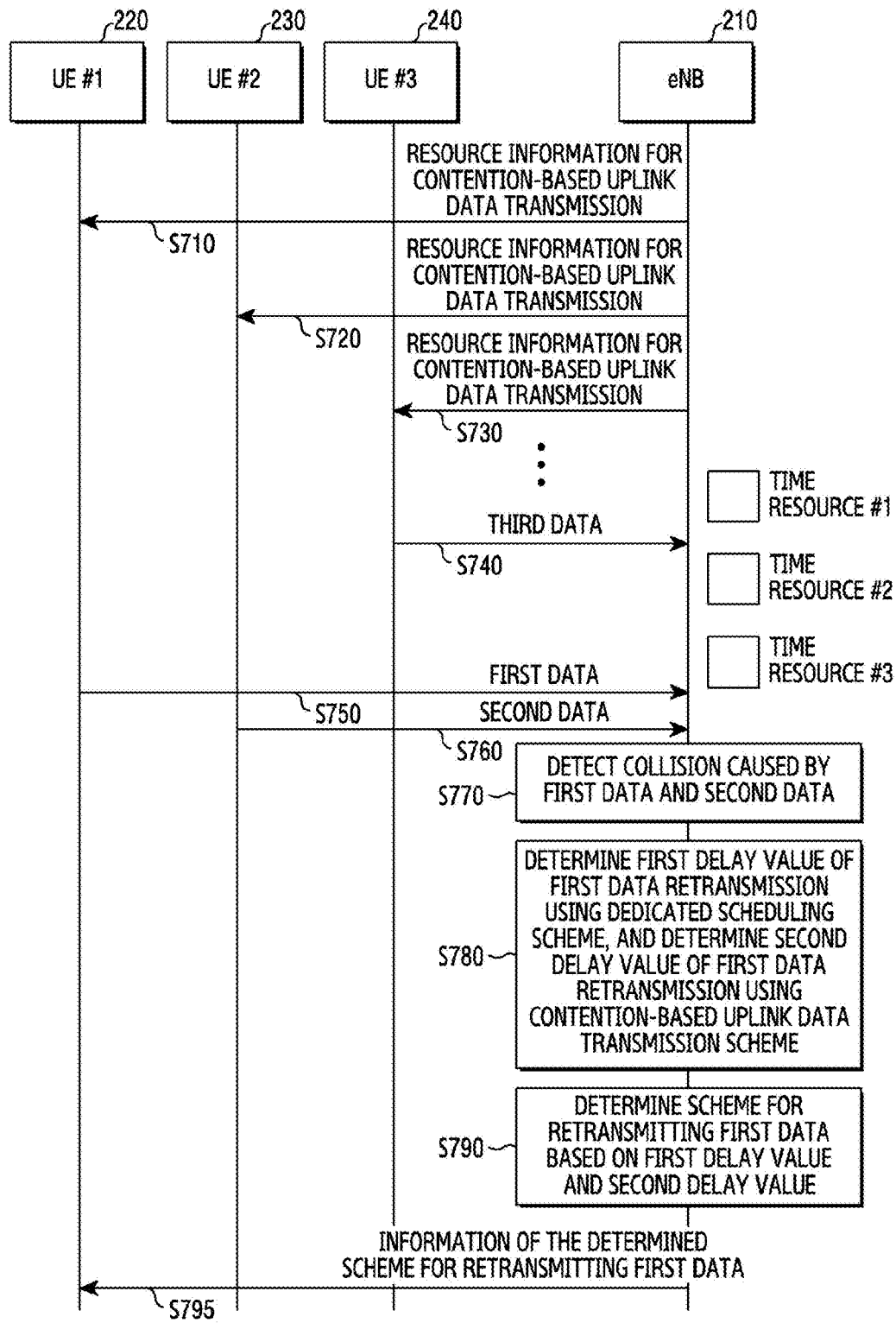
FIG. 7 illustrates signal flows between an eNB which determines a data retransmission scheme in contention-based uplink data transmission and a UE according to various embodiments of the present disclosure.

FIG. 7 illustrates signal flows between a UE and an eNB which determines a data retransmission scheme in contention-based uplink data transmission according to various embodiments of the present disclosure.

Referring to FIG. 7, in S710, the eNB 210 can transmit resource information for contention-based uplink data transmission to the first UE 220. For example, the eNB 210 can transmit the resource information for the contention-based uplink data transmission to the first UE 220 through an uplink grant. The first UE 220 can receive the resource information for the contention-based uplink data transmission from the eNB 210.

In S720, the eNB 210 can transmit resource information for contention-based uplink data transmission to the second UE 230. For example, the eNB 210 can transmit the resource information for the contention-based uplink data transmission to the second UE 230 through an uplink grant. The second UE 230 can receive the resource information for the contention-based uplink data transmission from the eNB 210.

In S730, the eNB 210 can transmit resource information for contention-based uplink data transmission to the third UE 240. For example, the eNB 110 can transmit the resource information for the contention-based uplink data transmission to the third UE 240 through uplink grant. The third UE 240 can receive the resource information for the contention-based uplink data transmission from the eNB 110.

In S740, the third UE 240 can transmit third data in a third time resource randomly selected from the resources (e.g., a first time resource, a second time resource, and a third time resource) identified based on the received resource information for the contention-based uplink data transmission.

In S750, the first UE 220 can transmit first data in the third time resource randomly selected from the resources identified based on the received resource information for the contention-based uplink data transmission.

In S760, the second UE 230 can transmit second data in the third time resource randomly selected from the resources identified based on the received resource information for the contention-based uplink data transmission.

In S770, the eNB 210 can detect a collision caused by the first data and the second data. For example, the eNB 210 may not fully decode the first data and the second data received over the third time resource. This is because the first data and the second data are received over the same time resource which is the third time resource. In response to the failure to fully decode the first data and the second data, the eNB 210 can detect the collision caused by the first data and the second data.

Although the first data and the second data are not successfully fully decoded, the eNB 210 can still identify which entity transmits the first data and which entity transmits the second data based on DMRS. For example, the eNB 210 can detect the first data transmission from the first UE 220 and the second data transmission from the second UE 230 based on the DMRS.

In some embodiments, when the eNB 210 operates based on slotted ALOHA with Successive Interference Cancellation (SIC), the eNB 210 can receive and decode one of the first data and the second data and decode the other data.

In S780, the eNB 210 can determine a first delay value of the first data retransmission using a dedicated scheduling scheme, and determine a second delay value of the first data retransmission using the contention-based uplink data transmission scheme.

The first delay value can indicate a time taken to retransmit data using a resource allocated from the eNB 210. For example, the first delay value can indicate the time taken for the first UE 220 to request the resource for the first data retransmission from the eNB 210, for the eNB 210 to transmit resource information for the first data retransmission to the first UE 220, and for the first UE 220 to retransmit the first data based on the resource information for the first data retransmission. Namely, the first delay value can indicate a time interval between the first data transmission (S750) and the first data retransmission.

In response to the collision, the second delay value can indicate a time taken to retransmit the data using the contention-based uplink data transmission and to normally decode the retransmitted data. For example, the second delay value can be calculated based on Equation 2.

$$\text{latency} = \frac{1}{M * \binom{N}{1} P_a^1 (1 - P_a)^{N-1}} * T \qquad (2)$$

In Equation 2, M denotes the number of one or more time resources for the contention-based uplink data transmission, N denotes the number of one or more UEs for the contention-based uplink data transmission, $P_a$ denotes a probability that the first UE 220 retransmits the first data over one time resource for the contention-based uplink data transmission, and T denotes an interval (e.g., an interval between the first time resource and the second time resource or an interval between the second time resource and the third time resource) between the time resources for the contention-based uplink data transmission.

That is, the second delay value can indicate the time interval between the first data transmission (S750) and the normal decoding of the first data retransmitted using the contention-based uplink data transmission.

In S790, the eNB 210 can determine a scheme for retransmitting the first data based on the first delay value and the second delay value.

For example, when the first delay value is greater than the second delay value, the eNB 210 can determine the first data retransmission scheme as the contention-based uplink data transmission. This is because the delay in the contention-based uplink data transmission is less than the delay in the dedicated scheduling.

For example, when the first delay value is small than or equal to the second delay value, the eNB 210 can determine the first data retransmission scheme as the dedicated scheduling. This is because the delay in the contention-based uplink data transmission is greater than or equal to the delay in the dedicated scheduling.

In S795, the eNB 210 can transmit the determined first data retransmission scheme information to the first UE 220. For example, the eNB 210 can send a NACK signal including the determined first data retransmission scheme information to the first UE 220.

Although not depicted in FIG. 7, the eNB 210 can perform the operations corresponding to S770, S780, S790, and S795 in relation to the second UE 230.

As such, when the collision occurs in the contention-based uplink data transmission, the apparatus and the method according to various embodiments of the present disclosure can determine an expected delay value according to each retransmission scheme and thus determine the retransmission scheme with less delay. Also, the apparatus and the method according to various embodiments of the present disclosure can classify the retransmitted data according to the dedicated scheduling scheme, and the contention-based uplink data transmission scheme and thus reduce the number of the UEs which transmit or retransmit the data using the uplink data transmission. That is, the apparatus and the method according to various embodiments of the present disclosure can classify the retransmitted data according to the dedicated scheduling scheme and the contention-based uplink data transmission scheme, reduces the number of the UEs in the contention-based uplink data transmission scheme, and increase the probability of success of the contention-based uplink data transmission.

Figure 8A:
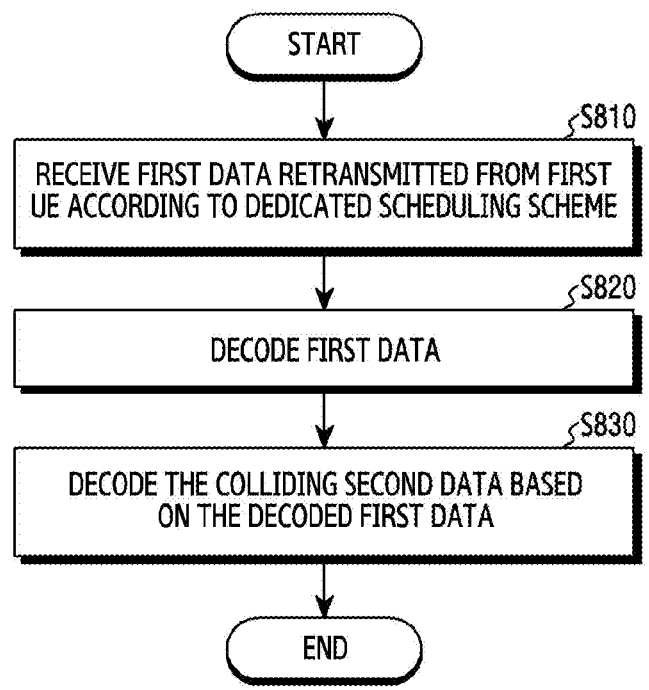
FIG. 8A illustrates an example of operations of an eNB for processing colliding data according to various embodiments of the present disclosure.

FIG. 8A illustrates an example of operations of an eNB for processing colliding data according to various embodiments of the present disclosure. These operations can be executed by the eNB 210.

In FIG. 8A, the eNB 210 is assumed to detect a collision caused by the first data received from the first UE 220 in the time resource for the contention-based uplink data transmission and the second data received from the second UE 230 in the time resource. Also, the eNB 210 is assumed to determine the dedicated scheduling scheme for the first data retransmission and to transmit information (i.e., information indicating that the first data retransmission scheme is the dedicated scheduling scheme) of the first data retransmission scheme determined, to the first UE 220. In addition, the eNB 210 is assumed to operate based on slotted ALOHA with SIC.

Referring to FIG. 8A, in S810, the eNB 210 can receive first data retransmitted from the first UE 220 according to the dedicated scheduling scheme.

In S820, the eNB 210 can decode the received first data. In S830, the eNB 210 can decode the colliding second data based on the decoded first data. Since the eNB 210 operates based on slotted ALOHA with SIC, the eNB 210, upon successfully decoding the first data, can decode the second data, wherein the second data is the other colliding data. That is, the eNB 210 can make the first UE 210 retransmit the first data using the dedicated scheduling, decode the first data, process the second data, and thus normally process (or restore) the colliding second data without signaling the second data.

As such, the apparatus and the method according to various embodiments of the present disclosure can operate based on the slotted ALOHA with SIC and thus reduce some signaling for the data processing. In other words, the apparatus and the method according to various embodiments of the present disclosure can decrease waste of the wireless resources in the system.

Figure 8B:
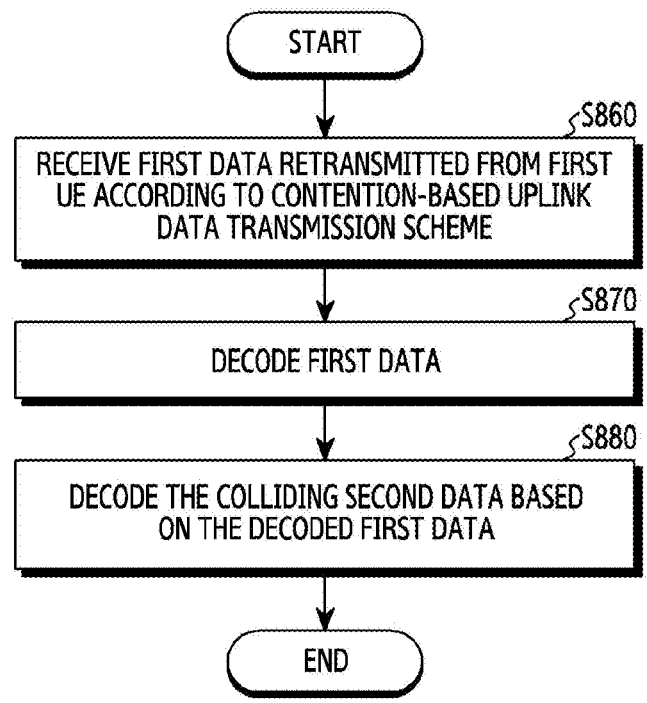
FIG. 8B illustrates another example of operations of an eNB for processing colliding data according to various embodiments of the present disclosure.

FIG. 8B illustrates another example of operations of an eNB for processing colliding data according to various embodiments of the present disclosure. These operations can be performed by eNB 210.

In FIG. 8B, the eNB 210 is assumed to detect a collision caused by the first data received from the first UE 220 in the time resource for the contention-based uplink data transmission and the second data received from the second UE 230 in the time resource. Also, the eNB 210 is assumed to determine the dedicated scheduling scheme for the first data retransmission and to transmit, to the first UE 220, information (i.e., information indicating that the first data retransmission scheme is the contention-based uplink data transmission scheme) of the first data retransmission scheme determined. In addition, the eNB 210 is assumed to operate based on the slotted ALOHA with SIC.

Referring to FIG. 8B, in S860, the eNB 210 can receive first data retransmitted from the first UE 220 according to the contention-based uplink data transmission scheme.

In S870, the eNB 210 can decode the received first data. In S880, the eNB 210 can decode the colliding second data based on the decoded first data. When the eNB 210, which operates based on the slotted ALOHA with SIC, successfully decoding the first data, it can decode the second data which is the other colliding data. That is, the eNB 210 can make the first UE 210 retransmit the first data using the contention-based uplink data transmission, decode the first data, process the second data, and thus normally process (or restore) the colliding second data without signaling the second data.

As such, the apparatus and the method according to various embodiments of the present disclosure can operate based on the slotted ALOHA with SIC and thus reduce signaling for data processing. In other words, the apparatus and the method according to various embodiments of the present disclosure can decrease wasting wireless resources in the system.

Figure 9:
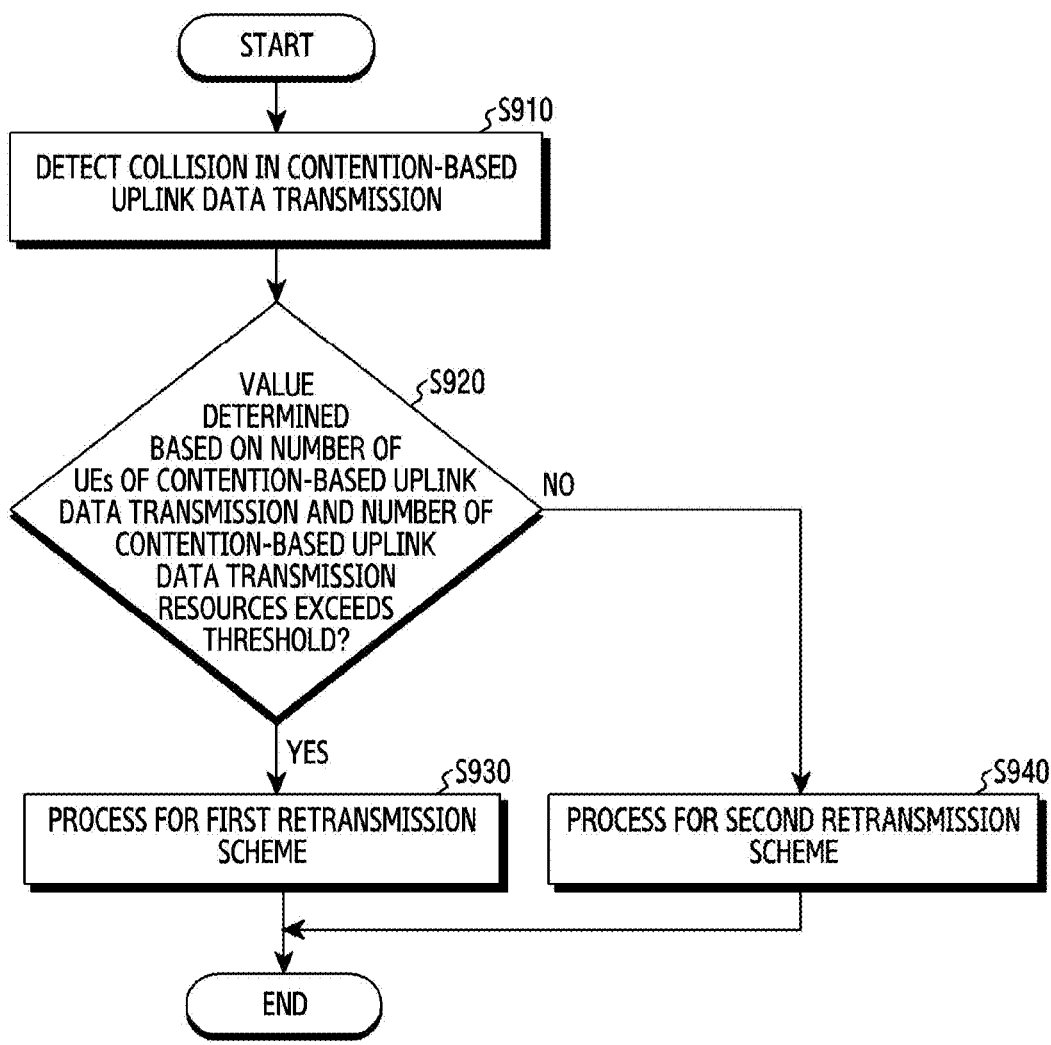
FIG. 9 illustrates operations of an eNB for determining a process for a retransmission scheme according to various embodiments of the present disclosure.

FIG. 9 illustrates operations of an eNB for determining a process for a retransmission scheme according to various embodiments of the present disclosure. These operations can be performed by the eNB 210 of FIG. 2.

Referring to FIG. 9, in S910, the eNB 210 can detect a collision in contention-based uplink data transmission. For example, when receiving data from a plurality of UEs in one time resource allocated for the contention-based uplink data transmission, the eNB 210 can detect the collision caused by the received data.

In S920, the eNB 210 can determine whether a value determined based on the total number of the UEs of the contention-based uplink data transmission and the number of the contention-based uplink data transmission resources, exceeds a threshold. For example, when the number of the UEs of the contention-based uplink data transmission is relatively large and the number of the contention-based uplink data transmission resources is relatively small, it may be inefficient to transmit the colliding data using the contention-based uplink data transmission. Hence, to determine a process for retransmitting the colliding data, the eNB 210 can determine whether the value determined based on the total number of the UEs of the contention-based uplink data transmission and the number of the contention-based uplink data transmission resources, exceeds the threshold. The determined value can indicate an amount of available wireless resources. When the determined value exceeds the threshold, the amount of available wireless resources can be relatively small. By contrast, when the determined value falls below the threshold, the amount of available wireless resources can be relatively great.

When the determined value exceeds the threshold, the eNB 210 can perform S930. By contrast, when the determined value falls below the threshold, the eNB 210 can perform S940.

In S930, the eNB 210 can conduct a process for a first retransmission scheme. The first retransmission scheme can identify the resource for retransmitting data with less complexity. For example, the first retransmission scheme can be carried out as shown in FIG. 2.

In S940, the eNB 210 can conduct a process for a second retransmission scheme. The second retransmission scheme can determine the data retransmission scheme. For example, the second retransmission scheme can be carried out as shown in FIG. 7.

As such, apparatus and methods according to various embodiments of the present disclosure can lessen the delay and the complexity in the uplink data transmission by adaptively changing the retransmission scheme based on the amount of wireless resources.

According to various embodiments, a method of an eNB can include determining priorities of UEs including a first UE and a second UE, transmitting priority information of the first UE and information about the number of the UEs to the first UE, and transmitting priority information of the second UE and the information about the number of the UEs to the second UE, detecting a collision caused by first data received from the first UE in a time resource for contention-based uplink data transmission and second data received from the second UE in the time resource, and identifying a first resource for retransmitting the first data based on the priority information of the first UE and the information about the number of the UEs, and sending a NACK signal including information indicating the collision to identify a second resource for retransmitting the second data based on the priority information of the second UE and the information about the number of the UEs, to the first UE and the second UE.

In some embodiments, the method can further include receiving the first data retransmitted from the first UE in the first time resource identified by the first UE, and receiving the second data retransmitted from the second UE in the second time resource identified by the second UE.

In some other embodiments, transmitting the priority information of the first UE and the information about the number of the UEs to the first UE and transmitting the priority information of the second UE and the information about the number of the UEs to the second UE can include transmitting the priority information of the first UE and the information about the number of the UEs to the first UE and transmitting the priority information of the second UE and the information about the number of the UEs to the second UE through an uplink grant.

In some other embodiments, the first time resource can correspond to the priority of the first UE, and the second time resource can correspond to the priority of the second UE.

In some other embodiments, determining the priorities of the UEs can include determining a type of data to receive from the UEs based on previous transmission information of the UEs, and determining the priorities of the UEs based on the determined data type.

In some other embodiments, the first resource and the second resource can be determined based on a HARQ period.

In some other embodiments, the first resource and the second resource can be determined based on a SPS period.

According to various embodiments, a method of an eNB can include detecting a collision caused by first data received from a first UE in a time resource for contention-based uplink data transmission and second data received from a second UE in the time resource, determining a first delay value in first data retransmission using a dedicated scheduling scheme, and determining a second delay value in the first data retransmission using a contention-based uplink data transmission scheme, determining a scheme for retransmitting the first data based on the first delay value and the second delay value, and transmitting information indicating the determined scheme to the first UE.

In some embodiments, determining the scheme for retransmitting the first data can include, when the first delay value is greater than the second delay value, determining the first data retransmission scheme as the contention-based uplink data transmission scheme, and, when the first delay value is small than or equal to the second delay value, determining the first data retransmission scheme as the dedicated scheduling scheme.

In some other embodiments, the first delay value can be determined at the first data transmission and the first data retransmission using a resource allocated to the first UE for the dedicated scheduling scheme, and the second delay value can be determined based on a probability that the first UE retransmits the first data in one time resource for the contention-based uplink data transmission, the number of one or more time resources for the contention-based uplink data transmission, and the number of one or more UEs for the contention-based uplink data transmission.

In some other embodiments, the method can further include receiving the first data retransmitted from the first UE using the determined scheme.

In some other embodiments, the method can further include determining the first data transmission from the first UE based on a DMRS received from the first UE, and determining the second data transmission from the second UE based on a DMRS received from the second UE.

Figure 10:
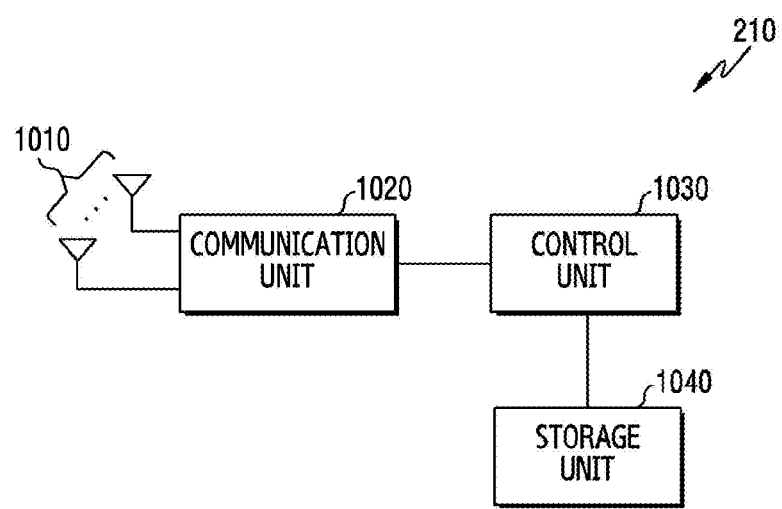
FIG. 10 illustrates a functional block diagram of an eNB according to various embodiments of the present disclosure.

FIG. 10 illustrates a functional block diagram of an eNB according to various embodiments of the present disclosure. This functional structure can be included in the eNB 210 of FIG. 2.

Referring to FIG. 10, the eNB 210 can include at least one antenna 1010, a communication unit 1020, a controller or control unit 1030, and a storage unit 1040.

The at least one antenna 1010 can include one or more antennas. The antenna 1010 can be configured for Multiple Input Multiple Output (MIMO).

The communication unit 1020 can send and receive signals over a wired or wireless channel.

The communication unit 1020 can convert a baseband signal to a bit stream and vice versa according to a physical layer standard of the system. For example, in data transmission, the communication unit 1020 can generate complex symbols by encoding and modulating a transmit bit stream. For example, in data reception, the communication unit 1020 can restore a receive bit stream by demodulating and decoding a baseband signal.

The communication unit 1020 can up-convert a baseband signal to a Radio Frequency (RF) signal and transmit the RF signal over the antenna 1010. The communication unit 1020 can down-convert an RF signal received via the antenna 1010 to a baseband signal. For example, the communication unit 1020 can include a transmit filter, a receive filter, an amplifier, a mixer, an oscillator, a Digital-to-Analog Converter (DAC), an Analog-to-Digital Converter (ADC), and so on.

The communication unit 1020 can be functionally coupled with the control unit 1030.

The communication unit 1020 can include at least one transceiver. Also, the communication unit 1020 can include a plurality of transmit paths each including an Inverse Fast Fourier Transform (IFFT) unit, a parallel-serial converter, and a DAC. Also, the communication unit 1020 can include a plurality of receive paths each including an FFT unit, a serial-parallel converter, and an ADC. In some embodiments, the communication unit 1020 can further include a Power Amplifier (PA) for amplifying the transmit signal, a Low Noise Amplifier (LNA) for amplifying the received signal, and/or a phase shifter.

The control unit 1030 can control the operations of the eNB 210. For example, the control unit 1030 can send or receive a signal through the communication unit 1020. The control unit 1030 can record data in the storage unit 1040 and read the recorded data from the storage unit 1040. For doing so, the control unit 1030 can include at least one processor. For example, the control unit 1030 can include a Communication Processor (CP) for controlling communication and an Application Processor (AP) for controlling a higher layer such as an application program.

The control unit 1030 can be configured to carry out the procedure and/or the methods of the present disclosure.

The storage unit 1040 can store control command code for controlling the eNB 210, control data, or user data. For example, the storage unit 1040 can include an application, an Operating System (OS), a middleware, and a device driver.

The storage unit 1040 can include at least one of a volatile memory and a nonvolatile memory. The volatile memory can include a Dynamic Random Access Memory (DRAM), a Static RAM (SRAM), a Synchronous DRAM (SDRAM), a Phase-change RAM (PRAM), a magnetic RAM (MRAM), a Resistive RAM (RRAM), and a Ferroelectric RAM (FeRAM). The nonvolatile memory can include a Read Only Memory (ROM), Programmable ROM (PROM), an Electrically PROM (EPROM), an Electrically Erasable PROM (EEPROM), and a flash memory.

The storage unit 1040 can include a nonvolatile medium such as a Hard Disk Drive (HDD), a Solid State Disk (SSD), an embedded Multi Media Card (eMMC), and a Universal Flash Storage (UFS).

The storage unit 1040 can be functionally coupled with the control unit 1030.

Figure 11:
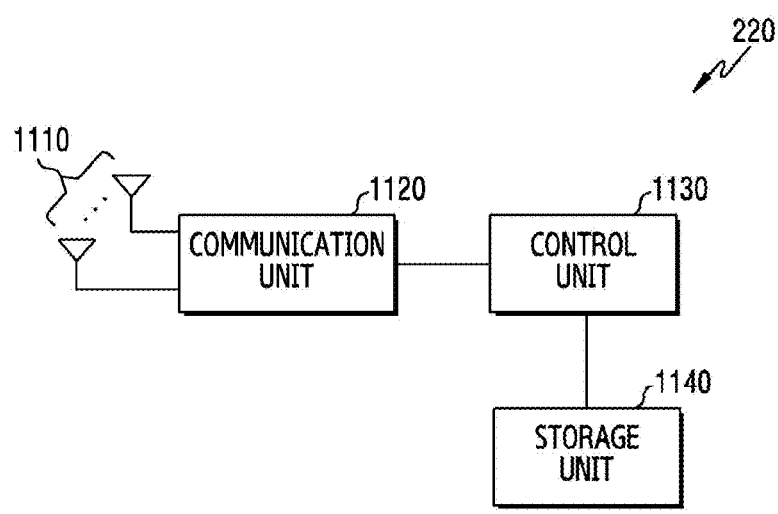
FIG. 11 illustrates a functional block diagram of a UE according to various embodiments of the present disclosure.

FIG. 11 illustrates a functional block diagram of a UE according to various embodiments of the present disclosure. This functional structure can be included in the first UE 220, the second UE 230, and/or the third UE 240 of FIG. 2.

Referring to FIG. 11, the first UE 220 can include at least one antenna 1110, a communication unit 1120, a controller or control unit 1130, and a storage unit 1140.

The at least one antenna 110 can include one or more antennas. The antenna 1110 can be configured for MIMO.

The communication unit 1120 can send and receive signals over a wired or wireless channel.

The communication unit 1120 can convert a baseband signal to a bit stream and vice versa according to a physical layer standard of the system. For example, in data transmission, the communication unit 1120 can generate complex symbols by encoding and modulating a transmit bit stream. For example, in data reception, the communication unit 1020 can restore a receive bit stream by demodulating and decoding a baseband signal.

The communication unit 1120 can up-convert a baseband signal to an RF signal and transmit the RF signal over the antenna 1110. The communication unit 1120 can down-convert an RF signal received via the antenna 1110 to a baseband signal. For example, the communication unit 1120 can include a transmit filter, a receive filter, an amplifier, a mixer, an oscillator, a DAC, an ADC, and so on.

The communication unit 1120 can be functionally coupled with the control unit 1130.

The communication unit 1120 can include at least one transceiver. Also, the communication unit 1120 can include a plurality of transmit paths each including an IFFT unit, a parallel-serial converter, and a DAC. Also, the communication unit 1120 can include a plurality of receive paths each including an FFT unit, a serial-parallel converter, and an ADC. In some embodiments, the communication unit 1120 can further include a PA for amplifying the transmit signal, a LNA for amplifying the received signal, and/or a phase shifter.

The control unit 1130 can control the operations of the first UE 220. For example, the control unit 1130 can send or receive a signal through the communication unit 1120. The control unit 1130 can record data in the storage unit 1140 and read the recorded data from the storage unit 1140. For doing so, the control unit 1130 can include at least one processor. For example, the control unit 1130 can include a CP for controlling communication and an AP for controlling a higher layer such as an application program.

The control unit 1130 can be configured to carry out the procedure and/or the methods of the present disclosure.

The storage unit 1140 can store control command code for controlling the first UE 220, control data, or user data. For example, the storage unit 1140 can include an application, an OS, a middleware, and a device driver.

The storage unit 1140 can include at least one of a volatile memory and a nonvolatile memory. The volatile memory can include a DRAM, a SRAM, a SDRAM, a PRAM, a MRAM, a RRAM, and a FeRAM. The nonvolatile memory can include a ROM, PROM, an EPROM, an EEPROM, and a flash memory.

The storage unit 1140 can include a nonvolatile medium such as a HDD, a SSD, an eMMC, and a UFS.

The storage unit 1140 can be functionally coupled with the control unit 1130.

According to various embodiments, an apparatus of an eNB can include at least one transceiver, and at least one processor functionally coupled with the at least one transceiver. The at least one processor can determine priorities of UEs including a first UE and a second UE, control to transmit priority information of the first UE and information about the number of the UEs to the first UE, and to transmit priority information of the second UE and the information about the number of the UEs to the second UE, detect a collision caused by first data received from the first UE in a time resource for contention-based uplink data transmission and second data received from the second UE in the time resource, and identify a first resource for retransmitting the first data based on the priority information of the first UE and the information about the number of the UEs, and control to send a NACK signal including information indicating the collision to identify a second resource for retransmitting the second data based on the priority information of the second UE and the information about the number of the UEs, to the first UE and the second UE.

In some embodiments, the at least one processor can control to receive the first data retransmitted from the first UE in the first time resource identified by the first UE, and to receive the second data retransmitted from the second UE in the second time resource identified by the second UE.

In some other embodiments, the at least one processor can control to transmit the priority information of the first UE and the information about the number of the UEs to the first UE and to transmit the priority information of the second UE and the information about the number of the UEs to the second UE through an uplink grant.

In some other embodiments, the first time resource can correspond to the priority of the first UE, and the second time resource can correspond to the priority of the second UE.

In some other embodiments, the at least one processor can determine a type of data to receive from the UEs based on previous transmission information of the UEs, and determine priorities of the UEs based on the determined data type.

In some other embodiments, the first resource and the second resource can be determined based on a HARQ period.

In some other embodiments, the first resource and the second resource can be determined based on a SPS period.

According to various embodiments, an apparatus of an eNB can include at least one transceiver, and at least one processor functionally coupled with the at least one transceiver and detecting a collision caused by first data received from a first UE in a time resource for contention-based uplink data transmission and second data received from a second UE in the time resource, determining a first delay value in first data retransmission using a dedicated scheduling scheme, and determining a second delay value in the first data retransmission using a contention-based uplink data transmission scheme, determining a scheme for retransmitting the first data based on the first delay value and the second delay value, and transmitting information indicating the determined scheme to the first UE.

In some embodiments, in determining the scheme for retransmitting the first data, the at least one processor can, when the first delay value is greater than the second delay value, determine the first data retransmission scheme as the contention-based uplink data transmission scheme, and, when the first delay value is small than or equal to the second delay value, determine the first data retransmission scheme as the dedicated scheduling scheme.

In some other embodiments, the first delay value can be determined at the first data transmission and the first data retransmission using a resource allocated to the first UE for the dedicated scheduling scheme, and the second delay value can be determined based on a probability that the first UE retransmits the first data in one time resource for the contention-based uplink data transmission, the number of one or more time resources for the contention-based uplink data transmission, and the number of one or more UEs for the contention-based uplink data transmission.

In some other embodiments, the at least one processor can control to receive the first data retransmitted from the first UE using the determined scheme.

In some other embodiments, the at least one processor can determine the first data transmission from the first UE based on a DMRS received from the first UE, and determine the second data transmission from the second UE based on a DMRS received from the second UE.

In the present disclosure, a particular operation conducted by the eNB 210 can be carried out by an upper node in some cases. That is, in a network including a plurality of network nodes including an eNB, various operations for communicating with a UE can be performed by the eNB or other network nodes than the eNB.

The apparatus and the method according to various embodiments of the present disclosure can control the uplink data retransmission and thus reduce the delay and/or the complexity in the uplink data transmission.

Methods according to embodiments stated in claims and/or specifications of the present disclosure may be implemented in hardware, software, or a combination of hardware and software.

The software may be stored in a computer-readable storage medium. The computer-readable storage medium stores at least one program (software module) including instructions that causes, when executed by at least one processor in the electronic device, the electronic device to perform the method of the present disclosure.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs) or other type optical storage devices, or a magnetic cassette. Alternatively, any combination of some or all thereof may form a memory in which the program is stored. Further, a plurality of such memories may be included in the electronic device.

In addition, the programs may be stored in an attachable storage device which may access the electronic device through communication networks such as the internet, intranet, local area network (LAN), wide LAN (WLAN), and storage area network (SAN) or a combination thereof. Such a storage device may access a device performing an embodiment of the present disclosure, via an external port. Further, a separate storage device on the communication network may access the device performing an embodiment of the present disclosure.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a base station, the method comprising:
   determining priorities for a plurality of terminals comprising a first terminal and a second terminal;
   transmitting, to the first terminal, priority information of the first terminal and information of a number of the plurality of terminals, and transmitting, to the second terminal, priority information of the second terminal and the information of the number of the plurality of terminals;
   detecting a collision caused by first data received from the first terminal in a time resource for contention-based uplink data transmission and second data received from the second terminal in the time resource; and
   identifying a first resource for retransmitting the first data based on the priority information of the first terminal and the information of the number of the plurality of terminals, and sending a negative acknowledgement (NACK) signal comprising information indicating the collision to identify a second resource for retransmitting the second data based on the priority information of the second terminal and the information of the number of the plurality of terminals, to the first terminal and the second terminal.

2. The method of claim 1, further comprising:
   receiving the first data retransmitted from the first terminal in the first resource identified by the first terminal; and
   receiving the second data retransmitted from the second terminal in the second resource identified by the second terminal.

3. The method of claim 1, wherein the priority information of both the first terminal and the second terminal and the information of the number of the plurality of terminals are transmitted to each of the first terminal and the second terminal through an uplink grant.

4. The method of claim 1, wherein the first resource corresponds to a priority of the first terminal, and the second resource corresponds to the priority of the second terminal.

5. The method of claim 1, wherein determining each of priorities for the plurality of terminals comprises:
   determining a type of data to receive from the plurality of terminals based on previous transmission information of the plurality of terminals; and
   determining the each of priorities for the plurality of terminals based on the determined type of the data.

6. The method of claim 1, wherein the first resource and the second resource are determined based on a hybrid automatic repeat request (HARQ) period.

7. The method of claim 1, wherein the first resource and the second resource are determined based on a semi-persistent scheduling (SPS) period.

8. An apparatus of a base station, the apparatus comprising:
   at least one transceiver; and
   at least one processor operatively connected to the at least one transceiver,
   wherein the at least one processor is configured to:
   determine priorities for a plurality of terminals comprising a first terminal and a second terminal,
   transmit priority information of the first terminal and information of a number of a plurality of terminals to the first terminal, and to transmit priority information of the second terminal and the information of the number of the plurality of terminals to the second terminal,
   detect a collision caused by first data received from the first terminal in a time resource for contention-based uplink data transmission and second data received from the second terminal in the time resource, and
   identify a first resource for retransmitting the first data based on the priority information of the first terminal and the information of the number of the plurality of terminals, and
   transmit a negative acknowledgement (NACK) signal comprising information indicating the collision to identify a second resource for retransmitting the second data based on the priority information of the second terminal and the information of the number of the plurality of terminals, to the first terminal and the second terminal.

9. The apparatus of claim 8, wherein the at least one processor is configured to:
   receive the first data retransmitted from the first terminal in the first resource identified by the first terminal, and
   receive the second data retransmitted from the second terminal in the second resource identified by the second terminal.

10. The apparatus of claim 8, wherein the at least one processor is configured to:
    transmit the priority information of the first terminal and the information of the number of the plurality of terminals to the first terminal, and
    transmit the priority information of the second terminal and the information of the number of the plurality of terminals to the second terminal through an uplink grant.

11. The apparatus of claim 8, wherein the first resource corresponds to a priority of the first terminal, and the second resource corresponds to the priority of the second terminal.

12. The apparatus of claim 8, wherein the at least one processor is configured to:
    determine a type of data to receive from the plurality of terminals based on previous transmission information of the plurality of terminals, and
    determine priorities of the plurality of terminals based on the determined data type.

13. The apparatus of claim 8, wherein the first resource and the second resource are determined based on a hybrid automatic repeat request (HARQ) period.

14. The apparatus of claim 8, wherein the first resource and the second resource are determined based on a semi-persistent scheduling (SPS) period.

* * * * *